(12) United States Patent
Inoue et al.

(10) Patent No.: US 11,569,042 B2
(45) Date of Patent: Jan. 31, 2023

(54) CAPACITOR AND METHOD FOR MANUFACTURING SAME

(71) Applicant: NIPPON CHEMI-CON CORPORATION, Tokyo (JP)

(72) Inventors: Ryuuta Inoue, Tokyo (JP); Yu Miura, Tokyo (JP); Kouichi Nakata, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 39 days.

(21) Appl. No.: 17/154,330

(22) Filed: Jan. 21, 2021

(65) Prior Publication Data

US 2021/0142950 A1 May 13, 2021

Related U.S. Application Data

(63) Continuation of application No. 16/331,247, filed as application No. PCT/JP2017/035295 on Sep. 28, 2017, now Pat. No. 11,011,316.

(30) Foreign Application Priority Data

Sep. 28, 2016 (JP) ................... 2016-189015

(51) Int. Cl.
*H01G 4/35* (2006.01)
*H01G 4/224* (2006.01)
(Continued)

(52) U.S. Cl.
CPC .............. *H01G 4/35* (2013.01); *H01G 2/02* (2013.01); *H01G 2/06* (2013.01); *H01G 4/224* (2013.01);
(Continued)

(58) Field of Classification Search
CPC .. H01G 4/35; H01G 2/02; H01G 2/06; H01G 4/224; H01G 9/08; H01G 9/10;
(Continued)

(56) References Cited

U.S. PATENT DOCUMENTS 5,580,358 A 12/1996 Narusawa et al.
6,040,974 A 3/2000 Rubin
(Continued)

FOREIGN PATENT DOCUMENTS

JP S51-162949 U 12/1976
JP 2-194614 A 8/1990
(Continued)

OTHER PUBLICATIONS

Office Action dated Feb. 1, 2022, issued in counterpart JP Application No. 2018-070796, with English Translation. (10 pages).
(Continued)

*Primary Examiner* — Michael P McFadden
(74) *Attorney, Agent, or Firm* — WHDA, LLP

(57) ABSTRACT

A capacitor and a method for manufacturing the capacitor are provided. The capacitor comprises (1) a capacitor main body including an outer package case, an opening sealing member attached to an inside of an open portion of the outer package case and a terminal lead penetrating through the opening sealing member; (2) a base attached to an outside of the open portion of the outer package case, the base including an insertion through hole through which the terminal lead passes to be disposed on an outer side of the base; and (3) a resin layer between the base and the opening sealing member.

9 Claims, 17 Drawing Sheets

(51) Int. Cl.
  *H01G 9/10* (2006.01)
  *H01G 11/78* (2013.01)
  *H01G 9/08* (2006.01)
  *H01G 2/02* (2006.01)
  *H01G 2/06* (2006.01)
  *H01G 11/84* (2013.01)
  *H01G 11/80* (2013.01)

(52) U.S. Cl.
  CPC ............... *H01G 9/08* (2013.01); *H01G 9/10* (2013.01); *H01G 11/78* (2013.01); *H01G 11/80* (2013.01); *H01G 11/84* (2013.01); *Y02E 60/13* (2013.01)

(58) Field of Classification Search
  CPC ........ H01G 11/78; H01G 11/80; H01G 11/84; H01G 9/008; H01G 9/02; H01G 9/045; H01G 9/145; H01G 2009/0408; Y02E 60/13
  See application file for complete search history.

(56) References Cited

U.S. PATENT DOCUMENTS

| | | | | |
|---|---|---|---|---|
| 6,698,066 | B2 | 3/2004 | Latham | |
| 6,898,066 | B1* | 5/2005 | Lin | H01G 9/10 361/519 |
| 9,672,985 | B2* | 6/2017 | Mori | H01G 9/008 |
| 2003/0117762 | A1* | 6/2003 | Takeishi | H01G 9/10 361/301.1 |
| 2011/0317333 | A1* | 12/2011 | Chun | H01M 50/543 361/518 |
| 2012/0321943 | A1* | 12/2012 | Ito | H01M 50/562 361/535 |
| 2013/0015981 | A1* | 1/2013 | Franc | H05K 5/064 340/815.4 |
| 2013/0250475 | A1* | 9/2013 | Mori | H01G 4/01 29/25.42 |
| 2014/0177131 | A1 | 6/2014 | Miura et al. | |
| 2014/0315071 | A1* | 10/2014 | Tsutsumi | H01M 50/103 429/163 |
| 2016/0197334 | A1* | 7/2016 | Ueda | H01M 10/0585 429/179 |
| 2020/0411252 | A1 | 12/2020 | Masuda et al. | |

FOREIGN PATENT DOCUMENTS

| | | |
|---|---|---|
| JP | 3-225912 A | 10/1991 |
| JP | H03-99427 U | 10/1991 |
| JP | 6-338439 A | 12/1994 |
| JP | H08-78287 A | 3/1996 |
| JP | 2000-269081 A | 9/2000 |
| JP | 2011-077368 A | 4/2011 |
| WO | 2019/045072 A1 | 3/2019 |

OTHER PUBLICATIONS

Office Action dated Feb. 1, 2022, issued in counterpart JP Application No. 2018-071477, with English Translation. (6 pages).
International Search Report dated Dec. 19, 2017, issued in counterpart application No. PCT/JP2017/035295, w/English translation (5 pages).
Written Opinion dated Dec. 19, 2017, issued in counterpart application No. PCT/JP2017/035295 (6 pages).
Notification of Transmittal of Translation of the International Preliminary Report on Patentability (Form PCT/IB/338) issued in counterpart International Application No. PCT/JP2017/035295 dated Apr. 11, 2019 with Forms PCT/IB/326, PCT/IB/373 and PCT/ISA/237, with English translation. (18 pages).
Extended (Supplementary) European Search Report dated May 6, 2020, issued in counterpart application No. 17856360.7. (8 pages).
Office Action dated Jun. 3, 2020, issued in counterpart CN application No. 201780056183.0, with English translation. (20 pages).
Office action dated Jun. 18, 2020, issued in U.S. Appl. No. 16/331,247.
Office Action dated Oct. 5, 2020, issued in U.S. Appl. No. 16/331,247.
Office Action dated Oct. 5, 2021, issued in counterpart JP application No. 2018-542871, with English translation. (8 pages).
Notice of Allowance dated Feb. 17, 2021, issued in U.S. Appl. No. 16/331,247 (10 pages).
Office Action dated May 25, 2021, issued in counterpart JP Application No. 2017-188679, with English translation. (6 pages).
Office Action dated Nov. 11, 2021, issued in counterpart KR Application No. 10-2019-7005526, with English Translation. (11 pages).
Office Action dated Apr. 24, 2022, issued in counterpart CN Application No. 202110196074.7, with English Translation. (15 pages).

* cited by examiner

CAPACITOR AND METHOD FOR MANUFACTURING SAME

CROSS-REFERENCE TO RELATED APPLICATIONS

This application is a continuation of U.S. application Ser. No. 16/331,247, filed on Mar. 7, 2019, which was the National Stage of International Application No. PCT/JP2017/035295, filed on Sep. 28, 2017, which is entitled to the benefit of priority of Japanese Patent Application No. 2016-189015, filed on Sep. 28, 2016, the contents of which are hereby incorporated by reference.

TECHNICAL FIELD

The present invention relates to a capacitor to be mounted on a wiring board such as a printed circuit board and relates to, for example, a capacitor having a base disposed on a side of an opening sealing member that seals a metal outer package case, and a method for manufacturing the capacitor.

BACKGROUND ART

To mount a capacitor on a wiring board, for example, the capacitor includes a base, and a mounting means is used to solder folded terminal leads that are pulled out to an outer side face of the base, to the wiring board. The capacitor used for this type of mounting is called "surface-mount capacitor". The surface-mount capacitor has high general versatility and is used in, for example, an automobile.

When a capacitor is disposed outdoors such as the inside of an automobile, the environmental temperature around the position at which the capacitor is disposed increases. The capacitor therefore needs to withstand a high temperature environment. For example, a resin layer is formed between an opening sealing body and a base of the capacitor and the sealability of the capacitor is thereby enhanced (see, e.g., Patent Literature 1). According to this configuration, the heat resistance of the capacitor can be improved. In the capacitor having the base, insertion through holes are formed in the base and terminal leads of the capacitor pass through the insertion through holes to be disposed on the outer side of the base.

CITATION LIST Patent Literature

Patent Literature 1: Japanese Laid-Open Patent Publication No. 6-338439

SUMMARY OF INVENTION

Technical Problem

The problems to be solved by the present invention relate to the sealability of a capacitor and, for example, the present invention is to solve at least one of the problems described in (1) to (3) below.

(1) The resin layer between the opening sealing body and the base is formed by, for example, injection of a resin after installation of the base. In this formation of the resin layer, when the resin passes through the insertion through holes that are provided for the base and allow the terminal leads to pass, and outflows on the side of a contact face in contact with the wiring board of the base, the amount of the resin filling a space between the opening sealing body and the base is reduced by the amount corresponding to the amount of the outflowing resin. A problem is present that a countermeasure is necessary such as removal of the resin outflowing to the exterior to avoid occurrence of any defect in the mounting onto the wiring board. When the filling with the resin is caused to discontinue at the timing at which the resin is recognized from the insertion through holes to prevent the resin from outflowing from the insertion through holes, the resin may insufficiently fill the space between the opening sealing body and the base, and a portion not yet filled may be generated between the opening sealing body and the base. When the amount of the filling resin is significantly reduced, a problem arises that the sealability of the capacitor is degraded.

(2) The sealing function of the surrounding portion of the resin layer may be more limited than that of the central portion of the resin layer. A problem arises that the limitation of the sealing function in the surrounding portion of the resin layer between the opening sealing body and the base, that is, the surrounding portion of the opening sealing body may influence the sealability of the capacitor.

(3) The resin layer between the opening sealing body and the base is formed by, for example, the injection of the resin after installation of the base. Any turbulence of the flow of the injected resin may cause the discharge path through which the air between the opening sealing body and the base moves toward the exterior, to disappear, and the possibility for bubbles to remain between the opening sealing body and the base becomes high. A problem is present that excessive bubbles reduce the amount of the resin filling the space between the opening sealing body and the base, and degrade the sealability of the capacitor. Another problem is present that even bubbles not substantially influencing the sealability of the capacitor cause anxiety that the sealability of the capacitor may be degraded. From the viewpoint of the quality control of the products, a problem is present that remainder of any bubble causing any unnecessary anxiety is disadvantageous.

Patent Literature 1 includes no disclosure and no suggestion for the above problems and the configuration disclosed in Patent Literature 1 cannot solve the above problems.

In view of the above circumstances, an object of the present invention is to improve the sealability of a capacitor, to maintain the sealability thereof, or to suppress any degradation of the sealability thereof and the object of the present invention is, for example, at least one of a first to a fourth objects.

(1) To suppress any outflowing of the resin filling the space between the opening sealing body and the base (the first object).

(2) To suppress any degradation of the sealability of the capacitor by the outflowing of the resin (the second object).

(3) To expand the sealed region of the capacitor by the resin (the third object).

(4) To suppress remainder of any bubble (the fourth object).

Solution to Problem

In order to achieve the above objects, a first aspect of the present invention is a capacitor that has a base including an insertion through hole, the base being disposed on a side of an opening sealing member of a capacitor main body, the opening sealing member being attached to an open portion of an outer package case of the capacitor main body, a terminal lead of the capacitor main body penetrating through the opening sealing member and passing through the insertion through hole to be disposed on an outer side of the base.

This capacitor includes a resin layer between the base and the opening sealing member, and the base or the opening sealing member includes a protruding portion that is adjacent to the resin layer.

The protruding portion of the capacitor may be disposed on a face portion on the side of the opening sealing member of the base and may surround the insertion through hole.

The protruding portion of the capacitor may be in contact with the opening sealing member.

The protruding portion of the capacitor may include a ventilation path that causes the insertion through hole to communicate with the resin layer between the base and the opening sealing member.

The base of the capacitor may include a resin injection hole that is used for injection of a resin; a through hole that is used for discharging air pushed out by the injection of the resin or for checking the injected resin; or the resin injection hole and the through hole.

The base of the capacitor may further include a protruding portion between the through hole and the resin injection hole.

The protruding portion of the capacitor may be disposed between the through hole and the resin injection hole.

The opening sealing member of the capacitor may include a protruding portion on an outer side surface that faces the base. The protruding portion of the opening sealing member may be disposed between a circumferential portion of the base and the through hole.

The capacitor may further include a resin path formed by a space between a tip portion of the outer package case and the base.

In order to attain the above objects, a second aspect of the present invention is a method for manufacturing a capacitor that has a base including an insertion through hole, the base being disposed on a side of an opening sealing member of a capacitor main body, the opening sealing member being attached to an open portion of an outer package case of the capacitor main body, a terminal lead of the capacitor main body penetrating through the opening sealing member and passing through the insertion through hole to be disposed on an outer side of the base. This method includes forming a protruding portion on the opening sealing member or the base; attaching the base on the side of the opening sealing member of the capacitor main body; and forming a resin layer between the base and the opening sealing member and causing the resin layer to be adjacent to the protruding portion.

In the method for manufacturing a capacitor, the protruding portion may be formed on the base when the base is formed, the protruding portion may be disposed on the side of the opening sealing member by attaching the base to the capacitor main body, and the protruding portion may surround the insertion through hole.

Advantageous Effects of Invention

According to the present invention, the sealability of a capacitor is improved, the sealability thereof is maintained, or any degradation of the sealability thereof is suppressed. For example, at least any one of the following effects is achieved.

(1) The base includes the protruding portion on the circumference of the insertion through hole, and any outflowing of the resin from the insertion through hole can thereby be suppressed.

(2) The resin can permeate between the opening sealing member and the base by the suppression of the outflowing of the resin, and high sealability can thereby be acquired. Though the possibility of evaporation of the electrolytic solution becomes high due to an increase of the temperature, the evaporation of the electrolytic solution can be suppressed and the capacitor can be used in a high temperature environment. Any degradation of the capacitor life due to the evaporation of the electrolytic solution can be suppressed.

(3) The capacitor includes the resin path formed by the space between the base and the tip portion of the outer package case, and the arrangement region of the resin is thereby expanded to be between the outer side of the tip portion of the outer package case and the base, and the sealability of the capacitor can thereby be enhanced.

(4) The capacitor includes the protruding portion, remainder of any bubble can thereby be suppressed, any degradation of the sealability of the capacitor can be suppressed, and the reliability can therefore be maintained.

MODES FOR CARRYING OUT THE INVENTION

Figure 1:
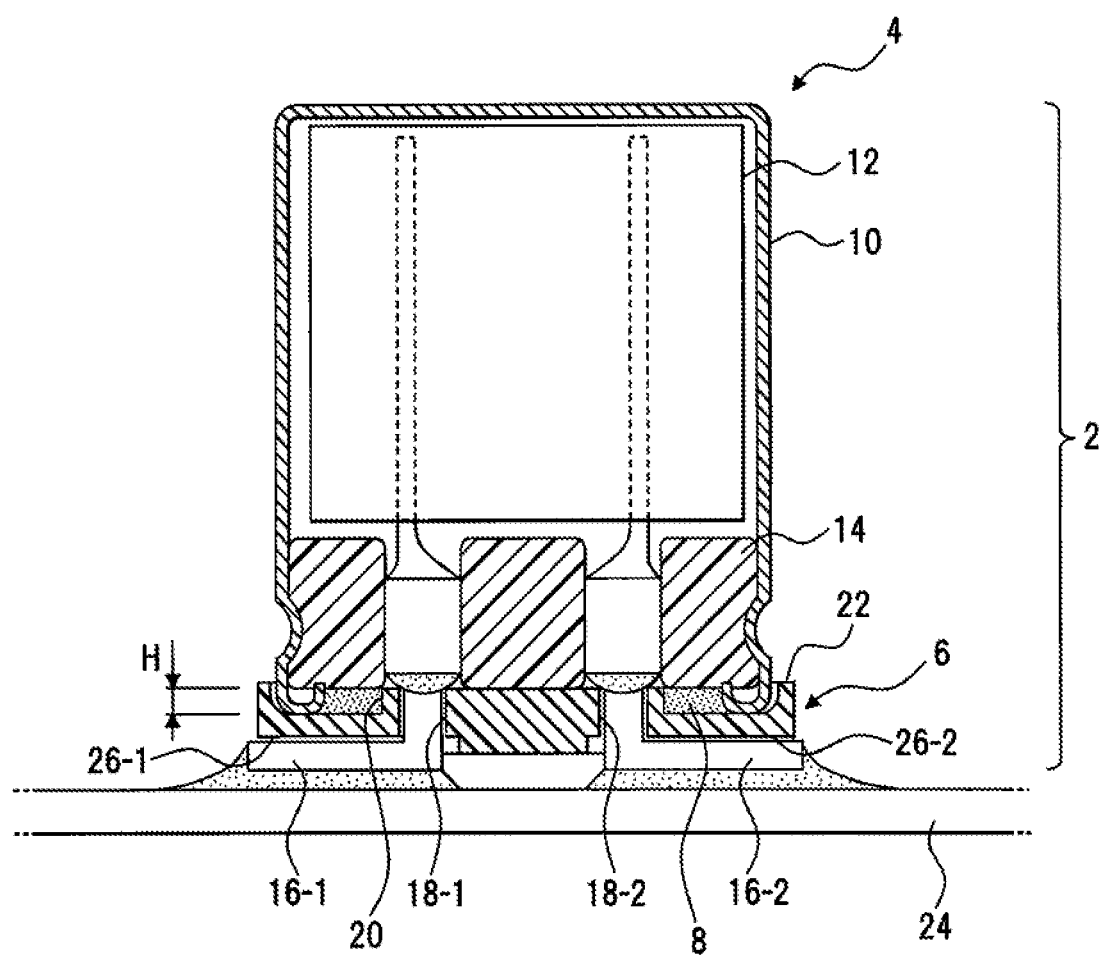
FIG. 1 is a cross-sectional diagram of an example of a capacitor according to a first embodiment.

The problems to be solved by an embodiment of this application relate to the sealability of a capacitor. For example, a resin layer between an opening sealing body and a base is formed by, for example, injecting a resin after the installation of the base. In this formation of the resin layer, when the base includes insertion through holes for terminal leads to pass therethrough and a resin passes through this insertion through holes and outflows on the side of a contact face of the base whose the contact face is to be contact with a wiring board, the amount of the resin filling a space between the opening sealing body and the base is reduced corresponding to the amount of the outflowing resin. A problem is present that a countermeasure is necessary such as removal of the resin outflowing to the exterior to avoid occurrence of any defect in the mounting onto the wiring board. When the filling by the resin is discontinued at the timing at which the resin is recognized through the insertion through holes to prevent the resin from outflowing from the insertion through holes, the resin may not sufficiently fill the space between the opening sealing body and the base, and a portion not yet filled may be generated between the opening sealing body and the base. When the amount of the filling resin is significantly reduced, a problem arises that the sealability of the capacitor is degraded. In view of these problems, an object of an embodiment of this application is, for example, to suppress any outflowing of the resin filling the space between the opening sealing body and the base, or to suppress any degradation of the sealability of the capacitor due to the outflowing of the resin. The base includes a protruding portion on the circumference of the insertion through holes, and an effect is thereby achieved that any outflowing of the resin from the insertion through holes can be suppressed. The resin can permeate between the opening sealing member and the base by the suppression of the outflowing of the resin, and an effect is achieved that high sealability can be acquired. Though the possibility of evaporation of the electrolytic solution becomes high due to an increase of the temperature, the evaporation of the electrolytic solution can be suppressed and an effect is achieved that the capacitor can be used in a high temperature environment. An effect is achieved that any degradation of the capacitor life due to the evaporation of the electrolytic solution can be suppressed.

For example, the sealing function of a circumferential portion of the resin layer may be more limited than that of the central portion of the resin layer. A problem is present that the limitation of the sealing function in the circumferential portion of the resin layer between the opening sealing body and the base, that is, the circumferential portion of the opening sealing body may influence the sealability of the capacitor. In view of this problem, an object of an embodiment of this application is to, for example, expand the sealed region of the capacitor by the resin. The capacitor includes a resin path formed by a space between the base and the tip portion of the outer package case, the arrangement area of the resin is thereby expanded up to a space between the outer side of the tip portion of the outer package case and the base, and the sealability of the capacitor can thereby be enhanced.

For example, the resin layer between the opening sealing body and the base is formed by, for example, the injection of the resin after the installation of the base. Any turbulence of the flow of the injected resin may cause a discharge path through which the air between the opening sealing body and the base moves toward the exterior, to disappear, and the possibility for bubbles to remain between the opening sealing body and the base is increased. A problem is present that excessive bubbles reduce the amount of the resin filling the space between the opening sealing body and the base, and degrade the sealability of the capacitor. A problem is present that even bubbles not substantially influencing the sealability of the capacitor cause anxiety that the sealability of the capacitor may be degraded. From the viewpoint of the quality control of the products, a problem is present that remainder of any bubble causing any unnecessary anxiety is disadvantageous. In view of the above problems, an object of an embodiment of this application is to, for example, suppress remainder of any bubble. The base includes a protruding portion, remainder of any bubble can thereby be suppressed, any degradation of the sealability of the capacitor can be suppressed, and the reliability can be maintained.

First Embodiment

A first embodiment of the present invention will be described with reference to FIG. 1 to FIG. 4B. FIG. 1 is a cross-sectional diagram of an example of a capacitor according to the first embodiment.

A capacitor 2 is an example of an electronic part and is, for example, an electrolytic capacitor or an electric double-layer capacitor. The capacitor 2 includes a capacitor main body 4, a base 6, and a resin layer 8. The capacitor main body 4 can be used alone as a capacitor. The capacitor main body 4 includes an outer package case 10, a capacitor element 12, and an opening sealing member 14. The capacitor element 12 is sealed up in the outer package case 10 and the opening sealing member 14 is attached to an opening of the outer package case 10.

The outer package case 10 is an aluminum case having a bottomed cylindrical shape. The capacitor element 12 is a wound element formed by winding an anode foil, a cathode foil and separators to be sandwiched between the anode foil and the cathode foil, and has terminal leads 16-1 and 16-2 are pulled out from the same face of the element. This capacitor element 12 is impregnated with an electrolytic solution. The opening sealing member 14 is formed by a rubber such as an insulating rubber.

The terminal leads 16-1 and 16-2 of the capacitor element 12 penetrate the opening sealing member 14 into which a curling-processed open end of the outer package case 10 bites. The curling-processed open end of the outer package case 10 and the opening sealing member 14 form an opening sealing portion of the capacitor main body 4.

The base 6 is disposed on the opening sealing portion of the capacitor main body 4. The base 6 is disposed on the side of the opening sealing member 14 of the capacitor main body 4. The base 6 is formed by an insulating plate of an insulating synthetic resin or the like. This insulating synthetic resin has heat resistance to the extent that the insulating synthetic resin can withstand the heating applied when the capacitor is mounted on the wiring board and is, for example, a polyester-based resin such as polybutylene terephthalate (PBT), polybutylene naphthalate (PBN), and polyethylene terephthalate (PET), a polyamide-based resin such as nylon, polyphenylene sulfide (PPS), polyphenylene oxide (PPO), a urea resin, a liquid crystal polymer (LCP), a phenol resin, or an epoxy resin.

The pair of terminal leads 16-1 and 16-2 protruding from the capacitor main body 4 penetrate a pair of insertion through holes 18-1 and 18-2 formed in the base 6 respectively, and are pulled out to the outer side of the base 6. A protruding portion 20 surrounding the insertion through holes 18-1 and 18-2 is disposed on the circumference of these insertion through holes 18-1 and 18-2. This protruding portion 20 faces the opening sealing member 14, and isolates the resin layer 8 adjacent to the protruding portion 20 and the insertion through holes 18-1 and 18-2 from each other. The base 6 includes a circumferential wall 22 in the circumferential portion of the base 6. The circumferential wall 22 is disposed on the outer side of the open end of the outer package case 10 and surrounds the open end.

The height of the protruding portion 20 is set to be, for example, an elevation difference H between the outer surface of the opening sealing member 14 and the open end of the outer package case 10. When the height of the protruding portion 20 is set to be the elevation difference H, the open end of the outer package case 10 and the base 6 are in contact with each other and the protruding portion 20 of the base 6 and the opening sealing member 14 are in contact with each other. The outer package case 10 and the protruding portion 20 function as a supporting portion, and the installation of the base 6 is thereby stabilized and the capacitor main body 4 is supported by both of the circumferential portion and the central portion. The protruding portion 20 in contact with the opening sealing member 14 can suppress any intrusion of the resin that forms the resin layer 8 into the insertion through holes 18-1 and 18-2 at a high level. In this case, a flow path for air is formed by a small gap between the opening sealing portion of the capacitor main body 4 and the base 6.

The height of the protruding portion 20 may be lower or may be higher than the elevation difference H. The protruding portion 20 lower than the elevation difference H can suppress any intrusion of the resin forming the resin layer 8 into the insertion through holes 18-1 and 18-2. A gap is formed between the protruding portion 20 and the opening sealing member 14, and can form a flow path for air to the insertion through holes 18-1 and 18-2 of the base 6. The protruding portion 20 higher than the elevation difference H is in contact with the opening sealing member 14 and can suppress any intrusion of the resin that forms the resin layer 8 into the insertion through holes 18-1 and 18-2 at a high level. A gap is formed between the open end of the outer package case 10 and the base 6, and can form a flow path for air.

The resin layer 8 is disposed on the outer side of the protruding portion 20, on the inner side of the open end of the outer package case 10, and between the base 6 and the opening sealing member 14. The resin layer 8 causes the capacitor main body 4 and the base 6 to adhere to each other and, together with the base 6, seals the opening sealing portion of the capacitor main body 4. The resin forming the resin layer 8 is, for example, a sealing resin that seals the opening sealing portion and is in a liquid form for the filling while the resin is hardened after the filling. For the filling, the gap between the capacitor main body 4 and the base 6 is filled with the liquid-form resin and, after the filling, the resin is hardened to form the resin layer 8. The resin forming the resin layer 8 has an affinity for the base 6, the outer package case 10, and the opening sealing member 14, has a blocking property against any gas, and advantageously has a linear expansion coefficient that is close to the linear expansion coefficient of aluminum (about $23 \times 10^{-6}/°$ C.), a small contraction amount for hardening, and non-hygroscopicity. The resin is, for example, an epoxy resin, an alkyd-based resin, a urethane resin, a thermosetting resin, or a UV-curable resin. The epoxy resin may be, for example, a two-component epoxy resin using an acid anhydride or may be a one-component epoxy resin.

The terminal leads 16-1 and 16-2 are formed by a highly electrically conductive metal. The terminal lead 16-1 is an anode side terminal, includes a lead portion pulled out from the anode foil of the capacitor element 12 and a terminal portion to be mounted on the wiring board 24, and is formed by connecting these portions to each other by welding or the like to integrate with each other.

The terminal lead 16-2 is a cathode side terminal, includes a lead portion pulled out from the cathode foil of the capacitor element 12 and a terminal portion to be mounted on the wiring board 24, and, same as or similar to the terminal lead 16-1, is formed by connecting these portions to each other by welding or the like to integrate with each other. Each lead portion has, for example, a columnar shape and each terminal portion is flattened on the side of its mounting face for its cross-section to have a rectangular shape.

The terminal portions of the terminal leads 16-1 and 16-2 are each folded in a direction opposite to that of each other respectively along guide grooves 26-1 and 26-2 formed on the base 6, to be disposed in the guide grooves 26-1 and 26-2 of the base 6. In this configuration, the base 6 regulates the arrangement of the terminal leads 16-1 and 16-2 and functions as a terminal board of the capacitor 2. Instead of the guide grooves 26-1 and 26-2, guide protrusions may be disposed on the side of the mounting face to the wiring board 24 of the base 6. In this case, the terminal portions of the terminal leads 16-1 and 16-2 are each folded in a direction opposite to that of each other along the guide protrusion formed on the base 6. The guide protrusions guide the terminal portions of the terminal leads 16-1 and 16-2, and can secure the stability of the capacitor 2 for its mounting by being disposed on the circumference of the folded terminal leads 16-1 and 16-2.

Figure 2:
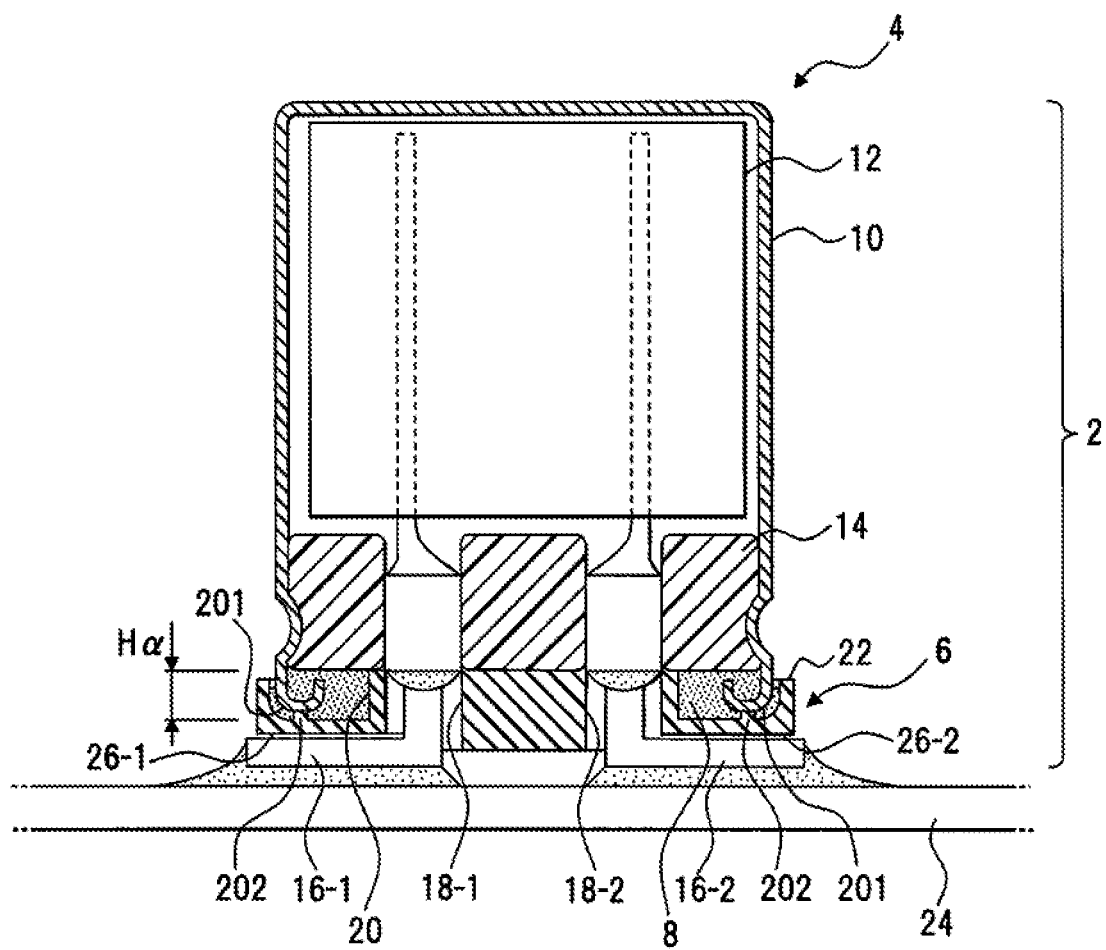
FIG. 2 is a cross-sectional diagram of an example of a capacitor that includes support protruding portions.

As depicted in FIG. 2, the base 6 may include support protruding portions 202 on the side more internal of the base 6 than the circumferential wall 22. This support protruding portions 202 are an example of protruding portions that support the tip portion of the outer package case 10, are in contact with the resin layer 8, and are discontinuously formed at positions for the base 6 to be in contact with the tip portion of the outer package case 10. In the portion for the support protruding portions 202 to be formed, a first portion of the tip portion of the outer package case 10 is in contact with the support protruding portions 202 of the base 6. In the portion for the support protruding portions 202 to be divided, a second portion of the tip portion of the outer package case 10 is separate from the base 6 and gaps are formed between the tip portion of the outer package case 10 and the base 6. The gaps between the tip portion of the outer package case 10 and the base 6 form resin paths 201 to cause the resin to flow into a gap between the circumferential wall 22 of the base 6 and the outer circumferential face of the outer package case 10.

The resin passes through the gaps between the outer package case 10 and the base 6, and reaches between the circumferential wall 22 and the outer circumferential face of the outer package case 10 with the inclusion of the support protruding portions 202. The resin fills a space between the circumferential wall 22 and the outer package case 10 and a space between the base 6 and the tip portion of the outer package case 10, and the sealability of the capacitor 2 by the resin can be enhanced.

In the case where the base 6 includes the support protruding portions 202, as depicted in FIG. 2, the height of the protruding portion 20 is set to be, for example, a height Hα acquired by adding the height of the support protruding portions 202 to the elevation difference H. When the protruding portion 20 is set to have the height Hα, an advantage can be acquired that is same as or similar to that with the protruding portion 20 having the elevation difference H without the support protruding portions 202. The protruding portion 20 may be lower or may be higher than the height Hα.

As depicted in FIG. 2, the curling-processed open end of the outer package case 10 may be separate from the opening sealing member 14. In the case where the open end of the outer package case 10 is set to be separate from the opening sealing member 14, for example, the opening sealing member 14 is fixed by swaging the side face of the outer package case 10. When the open end of the outer package case 10 is separate from the opening sealing member 14 and a gap is formed therebetween, the resin can be injected from this gap onto the inner side of the curling-processed open end of the outer package case 10 and the sealability is further improved. The open end of the outer package case 10 is arranged in the resin layer 8, the outer package case 10 and the resin layer 8 are thereby further integrated with each other, and the fixation strength between the resin layer 8 and the outer package case 10 is improved.

Figure 3A:
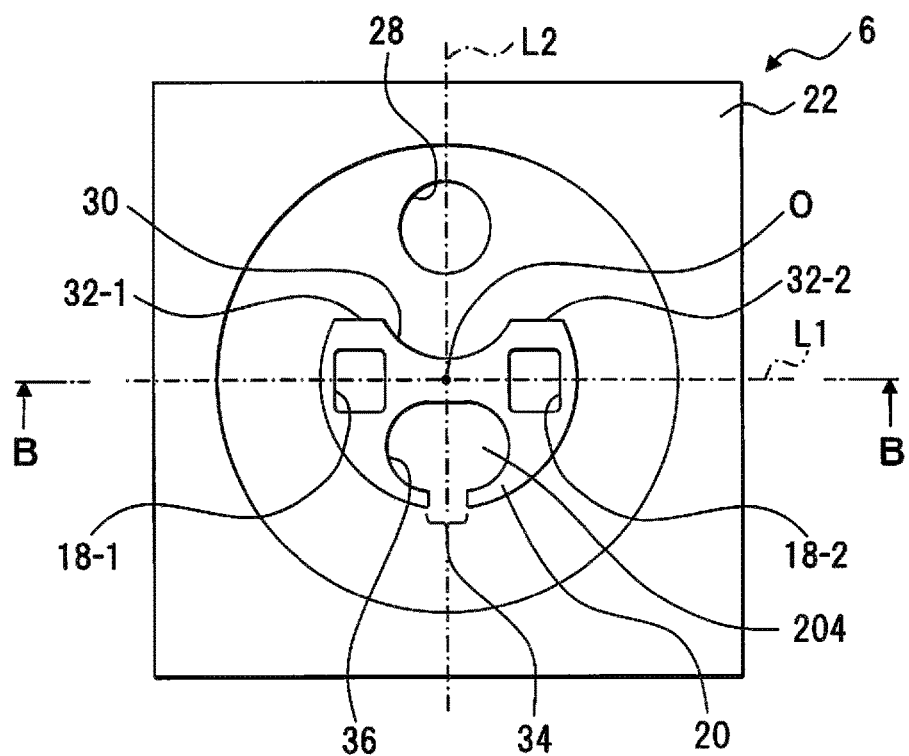
FIGS. 3A to 3C are diagrams of an example of a base of the capacitor.
Figure 3B:
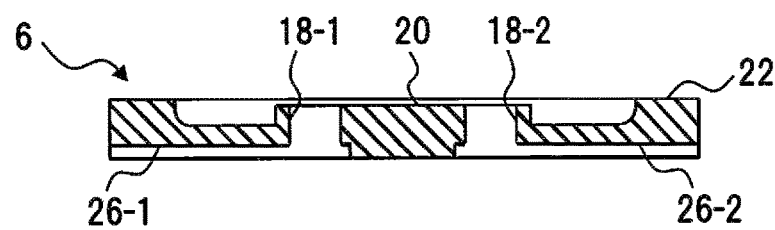
Figure 3C:
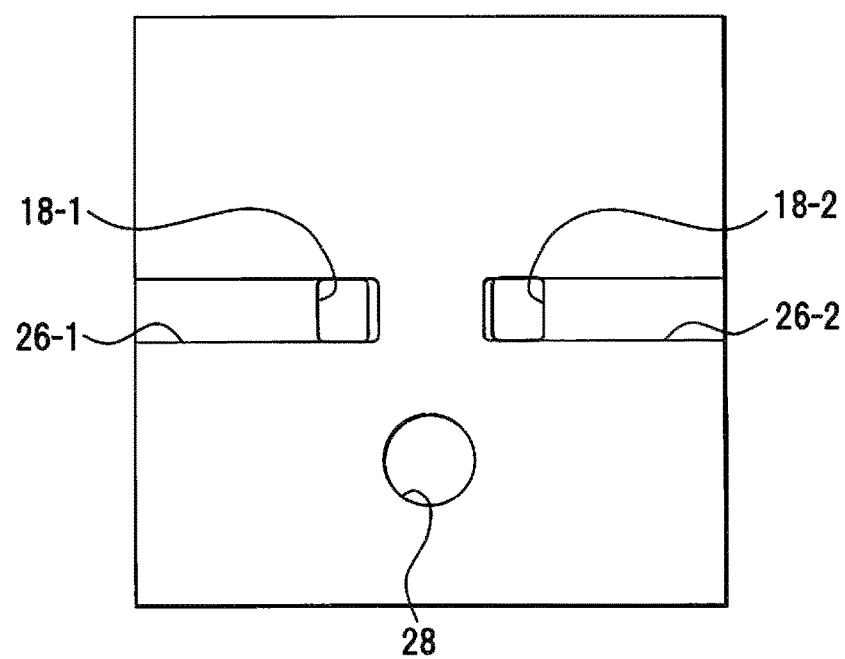
Figure 4A:
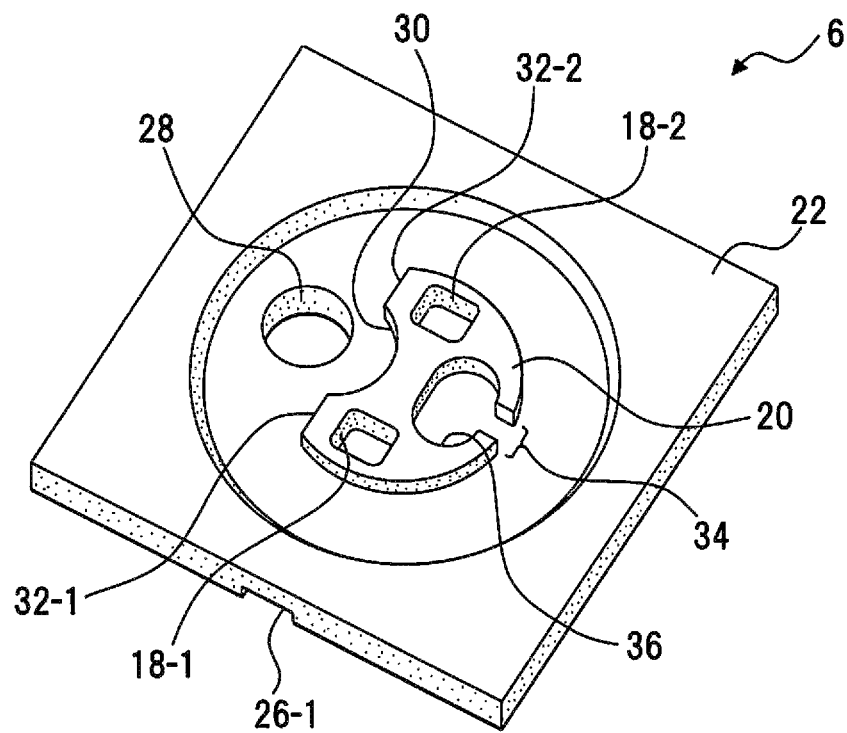
FIGS. 4A and 4B are perspective diagrams of the base and a diagram of an example of a flow of a resin.
Figure 4B:
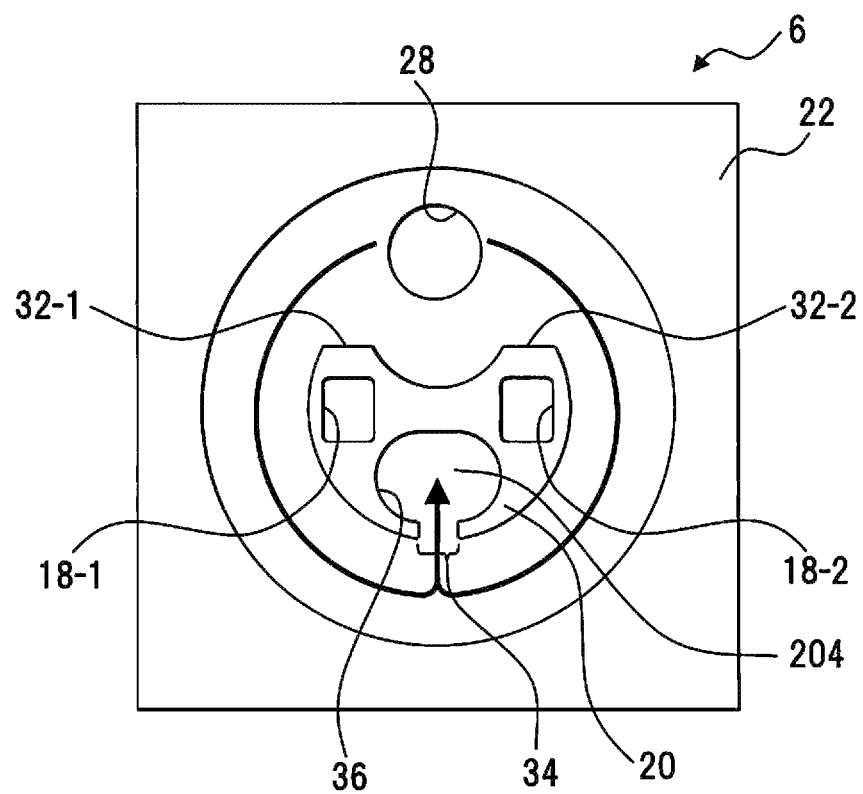

FIG. 3A to FIG. 4B will be referred to for the base 6. FIG. 3A is a plan diagram of the base 6 and depicts a face portion that is a main body installation face to be disposed on the capacitor main body 4 and that is on the side of the opening sealing member of the base 6. FIG. 3B depicts a cross-section taken along B-B in FIG. 3A. FIG. 3C is a bottom diagram of the base 6 and depicts a opposite face to the main body installation face. The opposite face is an outer side face of the base 6. FIG. 4A is a perspective diagram of the base 6 and FIG. 4B depicts the flow of the resin. An arrow depicted in FIG. 4B depicts the injection path of the resin. In the base 6 depicted in FIG. 3A to FIG. 4B, the support protruding portions 202 are omitted, while the base 6 may include the support protruding portions 202.

It is assumed that an imaginary line L1 connecting the insertion through hole 18-1 and the insertion through hole 18-2 of the base 6 and a midpoint O of the insertion through hole 18-1 and the insertion through hole 18-2 are present as depicted in FIG. 3A. A resin injection hole 28 is formed on a central line L2 that passes through the midpoint O and that is perpendicular to the imaginary line L1. The resin injection hole 28 is an example of the insertion through hole that is used for injection of a resin, and is formed at equal distances from the insertion through holes 18-1 and 18-2. The inner side face of the circumferential wall 22 has a circular shape to match with the outer circumference of the outer package case 10 that has the bottomed cylindrical shape. The inner side face of the circumferential wall 22 may be larger than the outer circumference of the outer package case 10. In this case, as depicted in FIG. 2, the resin may fill the space between the circumference of the outer package case 10 and the circumferential wall 22. Setting as above can further maintain the sealability or the airtightness.

The facing face portion of the protruding portion 20 faces the resin injection hole 28 and includes a retreat portion 30 having an arc shape and flat portions 32-1 and 32-2 arranged on the right and the left of the retreat portion 30. The outer edge portion of the protruding portion 20 other than the facing face portion is formed in an arc shape that is concentric with the circle formed by the circumferential wall 22. An opening 34 is formed in a middle portion of the outer edge portion having the arc shape and on the central line L2 away from the resin injection hole 28, and a retreat portion 36 connected to the opening 34 is formed on the inner side of the protruding portion 20. The retreat portion 36 has an oval shape.

The retreat portion 30 guides the resin injected from the resin injection hole 28 rightward and leftward relative to the central line L2 by the arc shape thereof. The retreat portion 30 is retreated toward the side of the midpoint O, the arrangement range of the resin can thereby be expanded. The flat portions 32-1 and 32-2 guide the resin rightward and leftward relative to the central line L2 and thereby suppress any intrusion of the resin into the insertion through holes 18-1 and 18-2. As depicted in FIG. 4B, the outer edge portion formed in the arc shape guides the resin such that the resin flows on the outer side of the insertion through holes 18-1 and 18-2, and thereby suppresses any intrusion of the resin into the insertion through holes 18-1 and 18-2. The outer edge portion has the arc shape, the outer edge portion can thereby smoothly guide the resin injected from the resin injection hole 28 along the injection path for the resin depicted in FIG. 4B to the back face side of the insertion through holes 18-1 and 18-2. The opening 34 and the retreat portion 36 expand the arrangement range of the resin. The protruding portion 20 and the circumferential wall 22 are formed to be symmetric in the right-and-left direction about the central line L2, and the resin injected from the resin injection hole 28 can thereby symmetrically flows in the right-and-left direction about the central line L2.

A portion of the protruding portion 20 is disposed on a circumferential portion of a terminating portion 204 that the resin finally reaches in the resin injection, and between the terminating portion 204 and the resin injection hole 28. The protruding portion 20 suppresses any straightforward reaching of the resin injected from the resin injection hole 28 to the terminating portion 204, and suppresses any filling of the terminating portion 204 by the resin before the resin fully permeates from the resin injection hole 28 to the portion separate therefrom. The protruding portion 20 secures the time period up to the time when the resin fills the terminating portion 204 and suppresses remainder of any air in the vicinity of the terminating portion 204. The suppression of the remainder of any air enhances the sealability of the capacitor 2. The protruding portion 20 is advantageously disposed to surround 50% or more of the circumference of the terminating portion 204, and is desirably disposed to surround 66% or more thereof. To allow the resin to flow into the terminating portion 204, a portion of the terminating portion 204 such as, for example, 10% of the circumference of the terminating portion 204 is not surrounded by the protruding portion 20 and is opened.

As depicted in FIG. 3B, the circumferential wall 22 may be higher than the protruding portion 20, may have the equal height as that of the protruding portion 20, or may be lower than the protruding portion 20. As depicted in FIG. 3C, the guide grooves 26-1 and 26-2 extending outward from the insertion through holes 18-1 and 18-2 are formed on the outer side face of the base 6. The guide grooves 26-1 and 26-2 are symmetrically arranged in the right-and-left direction about the central line L2.

[Manufacturing Steps for Capacitor]

The manufacturing steps for the capacitor are an example of the method for manufacturing the capacitor of the present invention, and the manufacturing steps include a forming step for the capacitor main body 4, a forming step for the base 6, an attaching step of attaching the base 6 to the capacitor main body 4, a shaping step for the terminal leads 16-1 and 16-2, and an injection step for the resin.

At the forming step for the capacitor main body 4, the separator is sandwiched between the anode foil to which the terminal lead 16-1 is connected and the cathode foil to which the terminal lead 16-2 is connected and these components are wound to form the capacitor element 12. The capacitor element 12 is impregnated with the electrolytic solution and the capacitor element 12 is sealed up in the outer package case 10. The opening sealing member 14 is thereafter attached to the opening portion of the outer package case 10 to form the capacitor main body 4. The outer package case 10 is formed from, for example, aluminum.

At the forming step for the base 6, the base 6 having the above described shape is formed from an insulating synthetic resin. In this embodiment, the electrolytic capacitor is formed by impregnating the capacitor element 12 with the electrolytic solution while the formation of the capacitor is not limited to this and a solid electrolytic capacitor may be formed using the capacitor element 12 whose solid electrolyte layer is formed by being impregnated with a conductive polymer. A hybrid capacitor may be employed that is formed by impregnating the capacitor element 12 already impregnated with a conductive polymer, with an electrolytic solution.

At the attaching step for the base 6, the terminal leads 16-1 and 16-2 of the capacitor main body 4 are caused to penetrate the insertion through holes 18-1 and 18-2 of the base 6. The base 6 is moved to attach the base 6 to the side of the opening sealing member of the capacitor main body 4. At the attaching step, the protruding portion 20 of the base 6 is disposed on the side of the opening sealing member.

At the shaping step for the terminal leads 16-1 and 16-2, the terminal leads 16-1 and 16-2 are folded along the guide grooves 26-1 and 26-2 of the base 6 and the terminal portions of the terminal leads 16-1 and 16-2 are arranged in the guide grooves 26-1 and 26-2. The base 6 is fixed to the capacitor main body 4 by performing this shaping step.

At the injection step for the resin, the liquid-form resin injected from the resin injection hole 28 of the base 6 fills the gap between the capacitor main body 4 and the base 6. The injected resin forms the resin layer 8 between the capacitor main body 4 and the base 6. For example, a dispenser is used for the injection of the resin.

Characteristic items, advantages, modification examples, or the like will be listed below for the first embodiment.

(1) The above capacitor 2 can cope with the demands such as downsizing of an electronic device and improvement of the efficiency of the surface mounting thereof on the wiring board 24.

(2) In the above capacitor 2, the protruding portion 20 formed on the base 6 guides the liquid-form resin injected from the resin injection hole 28 and smooth filling by the resin of the gap between the capacitor main body 4 and the base 6 can be realized. The base 6 and the resin layer 8 enhance the sealability of the capacitor, and an evaporation suppressing structure for the electrolytic solution can be realized. As a result, a specific life of the capacitor can be acquired even when the capacitor is used in a high temperature environment.

(3) In the above capacitor 2, the protruding portion 20 of the base 6 can suppress any outflowing of the resin from the insertion through holes 18-1 and 18-2, any degradation and any dispersion of the injected amount of the resin can be suppressed, and the quality of the capacitor can be set to be uniform. When the resin outflows from the insertion through holes 18-1 and 18-2, an upward pushing force is applied to the terminal leads 16-1 and 16-2. In the above capacitor 2, however, the outflowing of the resin is suppressed, the resin does not thereby push upward the terminal leads 16-1 and 16-2, it is suppressed that portions of the terminal leads 16-1 and 16-2 to be soldered with the wiring board 24 leaves the mounting face to the wiring board 24 of the base 6, and the folding property of the terminal leads 16-1 and 16-2 can be improved.

(4) The above capacitor 2 includes the evaporation suppressing structure for the electrolytic solution by the base 6 and the resin layer 8, the opening sealing member 14 that is thin can thereby be used and demand of downsizing of the capacitor 2 or reducing the height thereof can be coped with.

(5) As depicted in FIG. 2, the base 6 includes the support protruding portions 202 on the more internal side than the circumferential wall 22, the tip portion of the outer package case 10 can thereby be separate from the base 6 in the dividing portion between the support protruding portions 202 and the gap can be formed between the outer side face of the outer package case 10 and the base 6. The resin spreads through this gap and the sealability of the capacitor 2 can be enhanced. The support protruding portions 202 may be formed on the tip portion of the outer package case 10 to form the gap. The support protruding portions 202 on the side of the base 6 can integrally be formed with the base 6 when the base 6 is formed. The load of forming the support protruding portions 202 can be suppressed.

(6) The portion of the protruding portion 20 is disposed between the terminating portion 204 for the resin injection and the resin injection hole 28, remainder of any air in the vicinity of the terminating portion 204 can thereby be suppressed, any degradation of the sealability of the capacitor 2 can be suppressed, and the reliability of the sealability can be maintained.

(7) The materials to form the base 6, the resin layer 8, the outer package case 10, and the opening sealing member 14 are each not limited to the above material and may be changed as necessary. It is preferred that the base 6 is transparent or translucent and the resin layer 8 is colored. The base 6 can be made transparent or translucent by using, for example, a polycarbonate (PC) resin. The filling state of the resin can be checked through the outer side face of the base 6 by using this base 6 and this resin layer 8.

Figure 5:
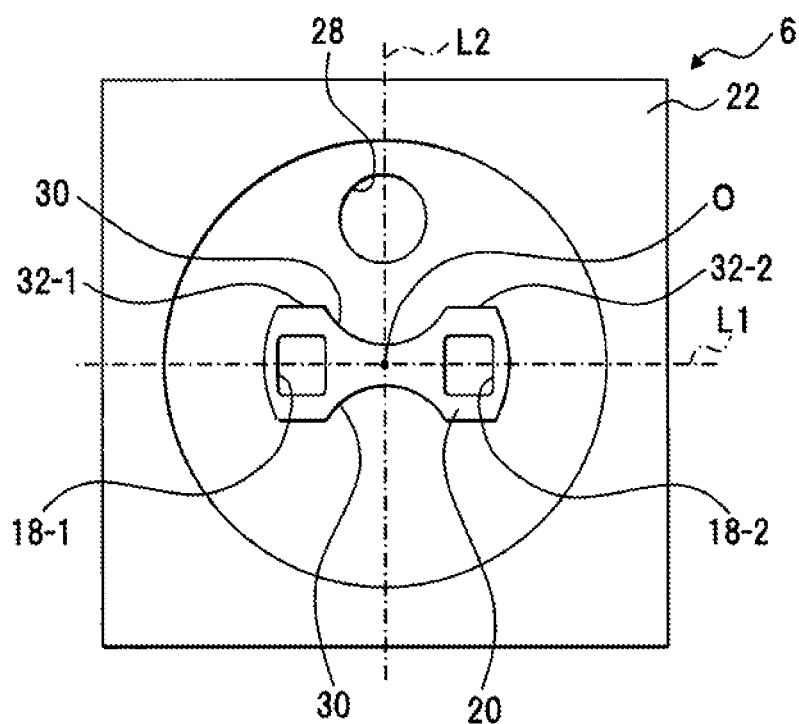
FIG. 5 is a diagram of a modification example of a protruding portion of the base.

(8) The protruding portion 20 surrounds the insertion through holes 18-1 and 18-2, while the shape thereof is not limited to the above shape and may be varied as necessary. For example, as depicted in FIG. 5, the facing face portion facing the resin injection hole 28 may include the retreat portion 30 and the flat portions 32-1 and 32-2, and the face portion opposite to this facing face portion (the opposite face portion opposite to the facing face portion) may include the retreat portion 30 and the flat portions 32-1 and 32-2 same as or similar to the facing face portion. Moreover, the protruding portion 20 may be formed symmetrically about the imaginary line L1 and the opposite face portion opposite to the facing face portion and the facing face portion may have the same shape. According to this protruding portion 20, the arrangement range of the resin can be expanded without degrading its function of suppressing any outflowing of the resin from the insertion through holes 18-1 and 18-2. The support protruding portions 202 are omitted in the base 6 depicted in FIG. 5, while the support protruding portions 202 may be included therein.

(9) The protruding portion 20 of the above capacitor 2 surrounds the overall circumference of the insertion through holes 18-1 and 18-2, while the protruding portion 20 may partially be divided and a ventilation path such as a groove or a through hole may be formed in the protruding portion 20. For example, even when the protruding portion 20 adjacent to the terminating portion 204 into which the resin finally flows in the resin injection is divided or the ventilation path is formed therein, the air pushed out by the injection of the resin can be discharged from the divided portion or the ventilation path without degrading the guiding function by the protruding portion 20 for the resin. The divided portion and the ventilation path do not need to be formed in the facing face portion of the protruding portion 20 that faces the resin injection hole 28. The resin flowing from the resin injection hole 28 can be prevented from flowing into the insertion through holes 18-1 and 18-2 by disposing the protruding portion 20 on the resin injection hole 28 side of the edge portions of the insertion through holes 18-1 and 18-2, and concurrently the air pushed out by the injection of the resin can be discharged by disposing the dividing portion or the ventilation path on the side of the edge portion of the insertion through holes 18-1 and 18-2 away from the resin injection hole 28.

Figure 6A:
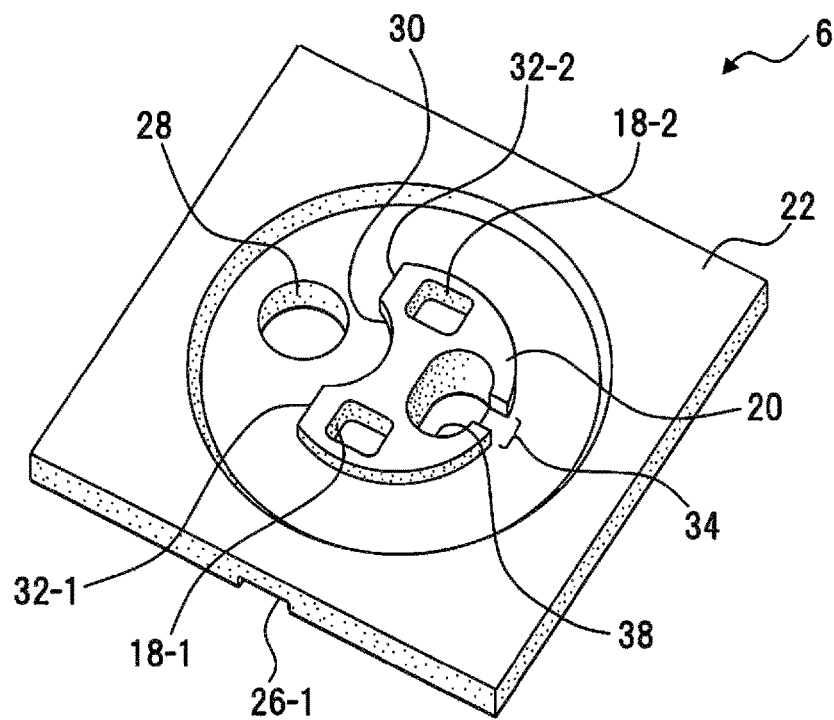
FIGS. 6A and 6B are diagrams of an example where a through hole is formed in a terminating portion of an injection path for the resin.
Figure 6B:
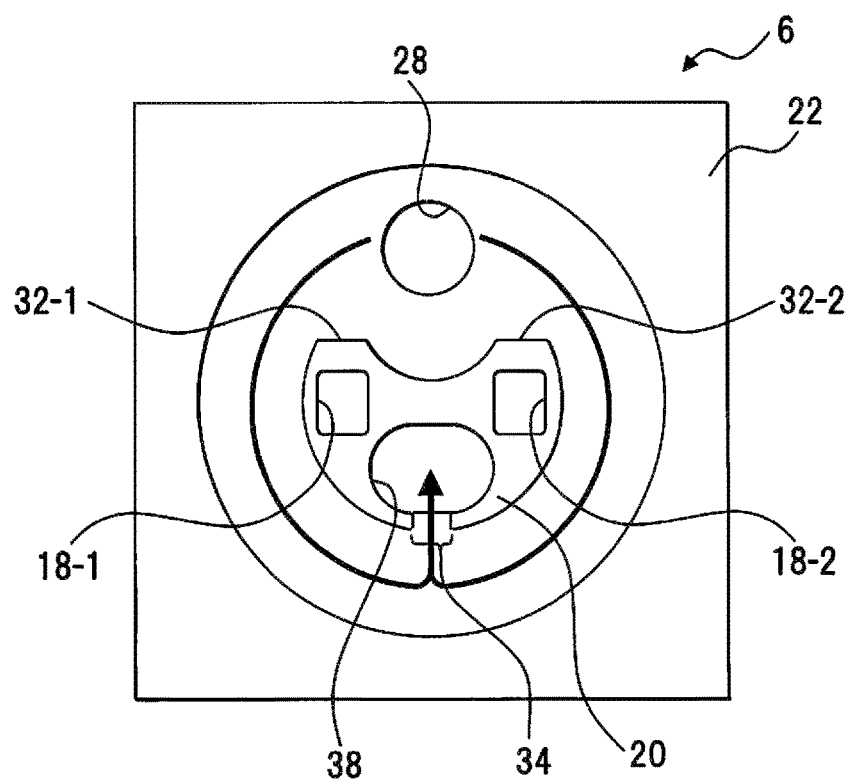

(10) As depicted in FIGS. 6A and 6B, the protruding portion 20 may include a through hole 38 different from the resin injection hole 28 and the insertion through holes 18-1 and 18-2. This through hole 38 is formed in, for example, the terminating portion 204 into which the resin finally flows in the resin injection and is used to check the resin that reaches the terminating portion 204 along the injection path of the resin. The through hole 38 is also used to discharge the air that is pushed out by the injection of the resin, and the check of the filling state of the resin is facilitated by the through hole 38 and the discharge of the air is also facilitated. The protruding portion 20 is disposed to be present along the edge portion of the through hole 38. It can be suppressed by arrangement of the protruding portion 20 surrounding the circumference of the through hole 38 to occur any clogging of the through hole 38 before the resin injected from the resin injection hole 28 fills the space between the opening sealing member 14 and the base 6. The resin can be caused to fill the space between the opening sealing member 14 and the base 6 suppressing the remainder of the air by the protruding portion 20 that surrounds the through hole 38 such that the resin finally flows into the through hole 38. The protruding portion 20 is adjacent to the edge portion of the through hole 38 and is not separated from this edge portion. Thus, remainder of any bubble is suppressed between the through hole 38 and the protruding portion 20. In the base 6 depicted in FIGS. 6A and 6B, the support protruding portions 202 are omitted, while the base 6 may include the support protruding portions 202.

(11) The resin may be caused to fill the insertion through holes 18-1 and 18-2 from the outer side face of the base 6. The spaces between the insertion through holes 18-1 and 18-2, and the terminal leads 16-1 and 16-2 are filled with the resin and the sealability can further be enhanced.

(12) The resin injection hole 28 is formed in the base 6, the resin is injected after the base 6 is disposed on the capacitor main body 4, and the resin layer 8 is thereby formed in the above embodiment, while these steps may be changed as necessary. The base 6 may be attached to the side of the opening sealing member of the capacitor main body 4 after the resin is adhered to the capacitor main body 4 or the base 6, and the resin may fully be permeated between the capacitor main body 4 and the base 6 for the resin to fill the gap between the capacitor main body 4 and the base 6. The resin filling the gap between the capacitor main body 4 and the base 6 forms the resin layer 8. According to the above configuration, the resin injection hole 28 does not need to be disposed. The resin does not fill the insertion through holes 18-1 and 18-2 with the protruding portion 20, and the base 6 can thereby easily be disposed on the capacitor main body 4.

Second Embodiment

A capacitor of this embodiment is an example of an electronic part and is, for example, an electrolytic capacitor or an electric double-layer capacitor. In this embodiment, the configuration of the capacitor main body 4, the configuration for the base to be disposed on the side of the opening sealing member of the capacitor main body 4, the configuration for the resin to fill the space between the capacitor main body 4 and the base, the material of the base, and the material of the resin forming the resin layer 8 are same as those of the first embodiment and will not again be described.

Figure 7A:
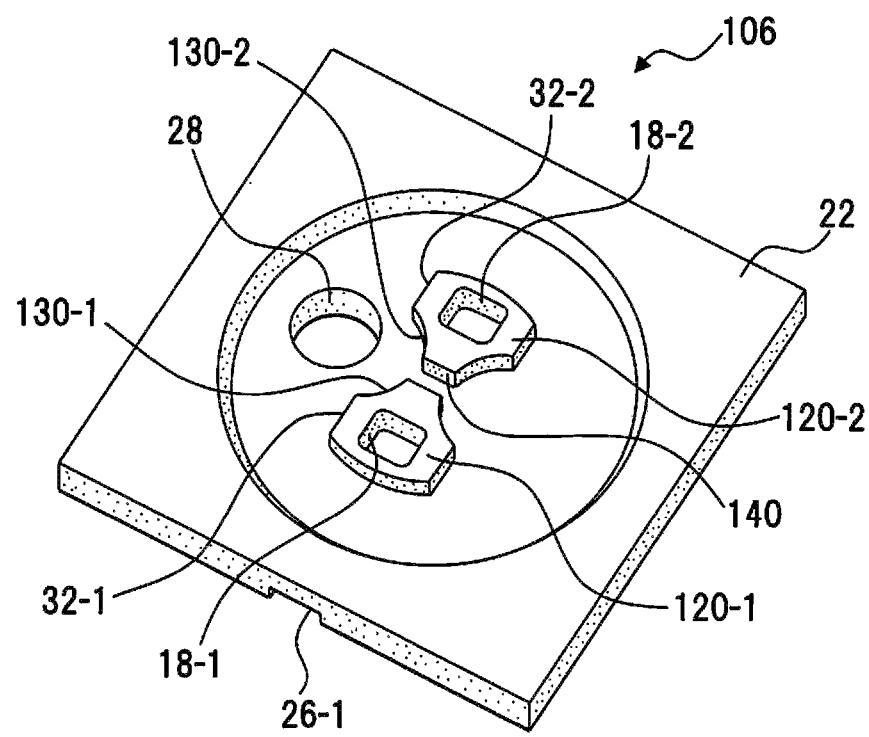
FIGS. 7A and 7B are perspective diagrams of a base of a capacitor according to a second embodiment and a diagram of an example of the flow of the resin.
Figure 7B:
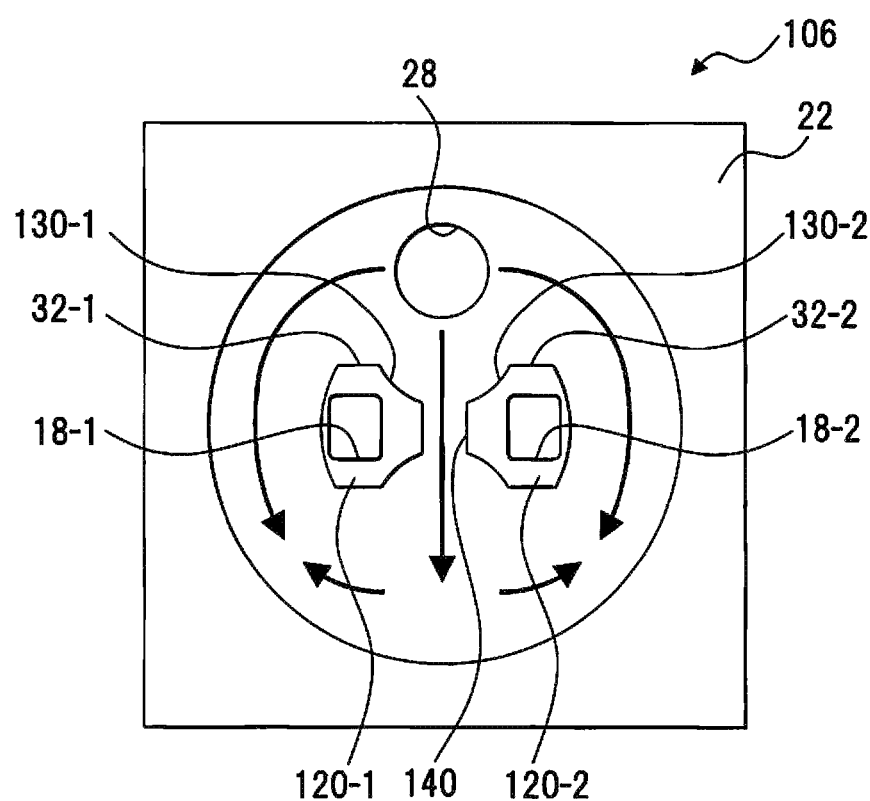

FIGS. 7A and 7B will be referred to for a base of this embodiment. FIG. 7A is a perspective diagram of the base and FIG. 7B depicts the flow of the resin. Arrows depicted in FIG. 7B indicate injection paths of the resin. In FIGS. 7A and 7B, same parts as those in FIGS. 3A to 4B are given the same reference signs. The support protruding portions 202 are omitted in a base 106 depicted in FIGS. 7A and 7B, while the base 106 may include the support protruding portions 202. For the base 106 depicted in FIGS. 7A and 7B, enclosures for the terminating portion by protruding portions 120-1 and 120-2 are omitted, while the enclosures for the terminating portion may be formed.

The base 106 has the insertion through holes 18-1 and 18-2 formed therein that are same as or similar to those of the first embodiment. The circumferences of these insertion through holes 18-1 and 18-2 are provided with a pair of protruding portions 120-1 and 120-2 surrounding the insertion through holes 18-1 and 18-2, and the protruding portions 120-1 and 120-2 surround the insertion through holes 18-1 and 18-2 respectively. The protruding portions 120-1 and 120-2 isolate the resin layer 8 and the insertion through holes 18-1 and 18-2 from each other same as or similar to that in the first embodiment. A resin path 140 for the resin to pass therethrough is formed between the protruding portions 120-1 and 129-2. The circumferential wall 22, the guide grooves 26-1 and 26-2, and the resin injection hole 28 included in the base 106, and the height of the protruding portions 120-1 and 120-2 are same as or similar to those of the first embodiment and will not again be described.

As depicted in FIG. 7A, a facing face portion of the protruding portion 120-1 facing the resin injection hole 28 includes a retreat portion 130-1 having an arc portion and a flat portion 32-1, and a facing face portion of the protruding portion 120-2 facing the resin injection hole 28 includes a retreat portion 130-2 having an arc shape and a flat portion 32-2. The retreat portion 130-1 and the retreat portion 130-2 are portions of one arc. When the retreat portions 130-1 and 130-2 are extended each in the arc shape, these arc shapes overlap with each other. The protruding portion 120-1 is formed to be symmetric about the imaginary line L1 and a face portion opposite to the facing face portion (the opposite face portion opposite to the facing face portion) has the retreat portion 130-1 and the flat portion 32-1 formed thereon. The protruding portion 120-2 is also formed to be symmetric and the opposite face portion opposite to the facing face portion has the retreat portion 130-2 and the flat portion 32-2 formed thereon.

Outer edge portions on the side of the resin path 140 of the protruding portions 120-1 and 120-2 are flat. On the other hand, outer edge portions (the opposite face portions) opposite to the outer edge portions on the side of the resin path 140 are each formed to have an arc shape that is concentric with the circle formed by the circumferential wall 22.

The retreat portions 130-1 and 130-2 each having the arc shape guide the resin injected from the resin injection hole 28 to the resin path 140. The retreat portions 130-1 and 130-2 retreat toward the side of the midpoint O, and the arrangement range of the resin can thereby be expanded. The flat portions 32-1 and 32-2 guide the resin rightward and leftward, and suppress any intrusion of the resin into the insertion through holes 18-1 and 18-2. As depicted in FIG. 7B, the outer edge portion formed in the arc shape (the opposite face portion of the outer edge portion on the side of the resin path 140) guides the resin for the resin to flow on the outer sides of the insertion through holes 18-1 and 18-2, and the resin path 140 guides the resin for the resin to flow along the central line L2. Both of these suppress any intrusion of the resin into the insertion through holes 18-1 and 18-2. The outer edge portion has the flat or the arc shape, the outer edge portion can thereby smoothly guide the resin injected from the resin injection hole 28 to the back face sides of the insertion through holes 18-1 and 18-2 along the injection path of the resin depicted in FIG. 7B. The protruding portions 120-1 and 120-2 are symmetrically formed in the right-and-left direction, and can thereby cause the resin injected from the resin injection hole 28 to flow symmetrically in the right-and-left direction.

The steps for manufacturing the capacitor according to this embodiment are same as or similar to the steps for manufacturing the capacitor according to the first embodiment and will not again be described.

Characteristic items, advantages, modification examples, or the like will be listed below for the second embodiment.

(1) The advantages same as or similar to those of the first embodiment are acquired, and same or similar modifications can be made.

(2) In the above capacitor, the resin passes on the outer side of the protruding portions 120-1 and 120-2 and through the resin path 140, and the resin can thereby fill in a short time period.

Third Embodiment

A capacitor of this embodiment is an example of an electronic part and is, for example, an electrolytic capacitor or an electric double-layer capacitor. In this embodiment, the configuration of the capacitor main body 4, the configuration for the base to be disposed on the side of the opening sealing member of the capacitor main body 4, the configuration for the resin to fill the space between the capacitor main body 4 and the base, the material of the base, and the material of the resin forming the resin layer 8 are same as or similar to those of the first embodiment and will not again be described.

Figure 8A:
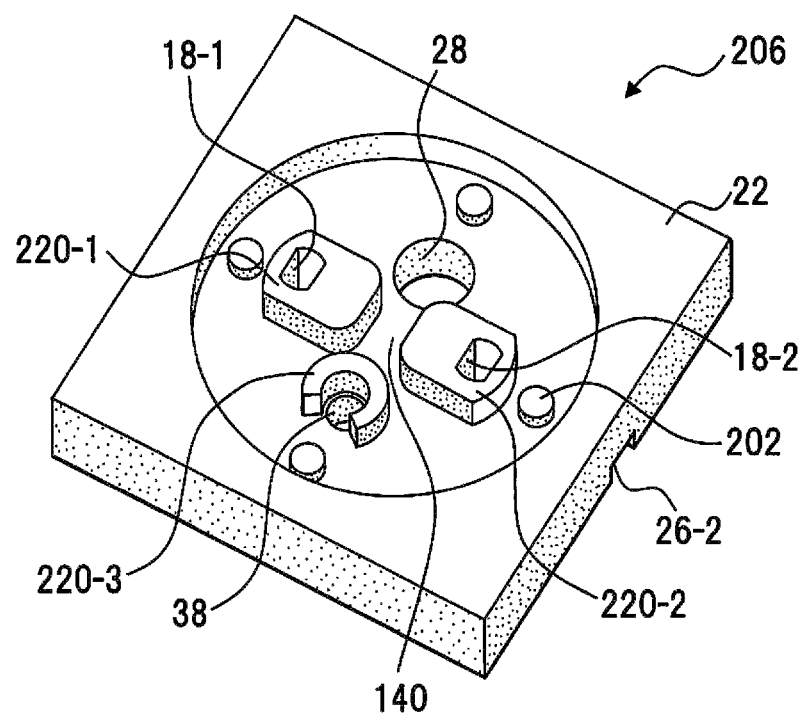
FIGS. 8A and 8B are perspective diagrams of a base of a capacitor according to a third embodiment and a diagram of an example of the flow of the resin.
Figure 8B:
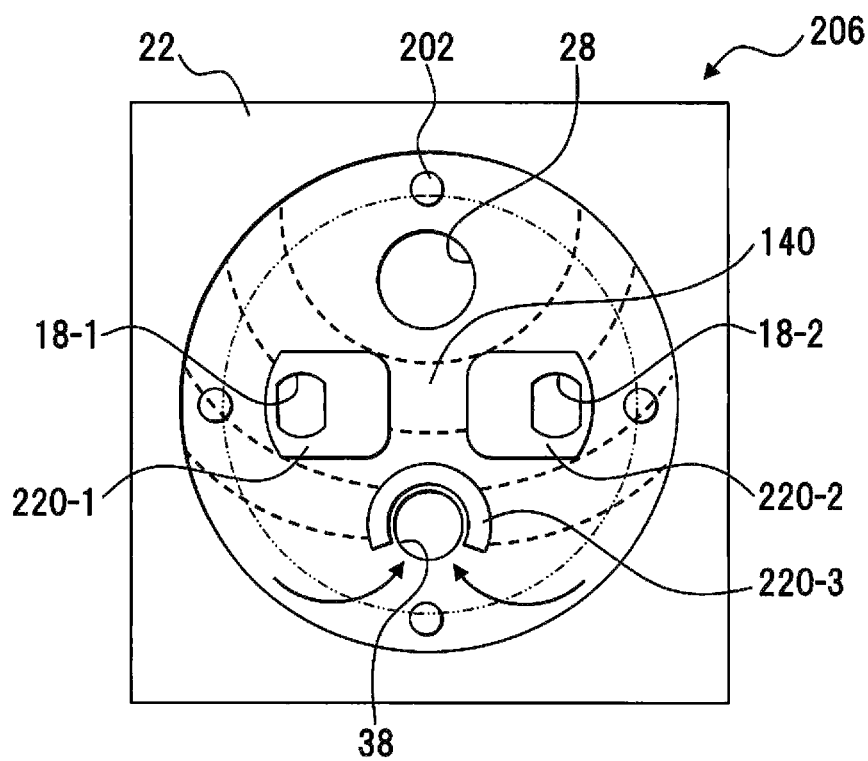

FIGS. 8A and 8B will be referred to for a base of this embodiment. FIG. 8A is a perspective diagram of the base and FIG. 8B depicts the flow of the resin. Dotted lines each in a curved line form depicted in FIG. 8B each indicate the position of the tip of the resin at one time point during the resin injection and indicate the state where the resin spreads. Arrows depicted in FIG. 8B indicate flows of the resin. A circular two-dot chain line along the circumferential wall 22 in FIG. 8B indicates the arrangement position of the curling-processed inner side end of the outer package case 10. In FIGS. 8A and 8B, same parts as those in FIG. 2, FIG. 3A, FIG. 3B, FIG. 3C, FIG. 4A, FIG. 4B, FIG. 6A and FIG. 6B are given the same reference signs.

The base 206 depicted in FIGS. 8A and 8B includes, for example, four support protruding portions 202 on the side more internal than the circumferential wall 22 of the base 206. The support protruding portions 202 are an example of the protruding portion that is in contact with the first portion of the tip portion of the above outer package case 10 and supports the tip portion. The support protruding portions 202 are formed at a position to face the tip portion of the outer package case included in the opening sealing portion. The shape of the support protruding portions 202 is, for example, a columnar shape and the four support protruding portions 202 are arranged at intervals of, for example, 90 degrees relative to the midpoint of the four support protruding portions 202. Two support protruding portions 202 are arranged on the outer side of the insertion through holes 18-1 and 18-2 so that the insertion through holes 18-1 and 18-2 are sandwiched between the two support protruding portions 202. The other two support protruding portions 202 are arranged on the outer side of the resin injection hole 28 and the through hole 38 so that the resin injection hole 28 and the through hole 38 are sandwiched between the other two support protruding portions 202. The four support protruding portions 202 each face the insertion through holes 18-1 and 18-2, the resin injection hole 28, or the through hole 38.

The base 206 has the insertion through holes 18-1 and 18-2 formed therein, and the insertion through holes 18-1 and 18-2 are same as or similar to those of the first embodiment. The base 206 includes a pair of protruding portions 220-1 and 220-2 (first protruding portions) surrounding the insertion through holes 18-1 and 18-2, on the circumference of the insertion through holes 18-1 and 18-2, and the protruding portions 220-1 and 220-2 surround the insertion through holes 18-1 and 18-2 respectively. The protruding portions 220-1 and 220-2 face the opening sealing member 14 in the same manner as that in the first embodiment and isolate the resin layer 8 and the insertion through holes 18-1 and 18-2 adjacent to the protruding portions 220-1 and 220-2, from each other. The resin path 140 for the resin to pass therethrough is formed between the protruding portions 220-1 and 220-2.

Figure 16:
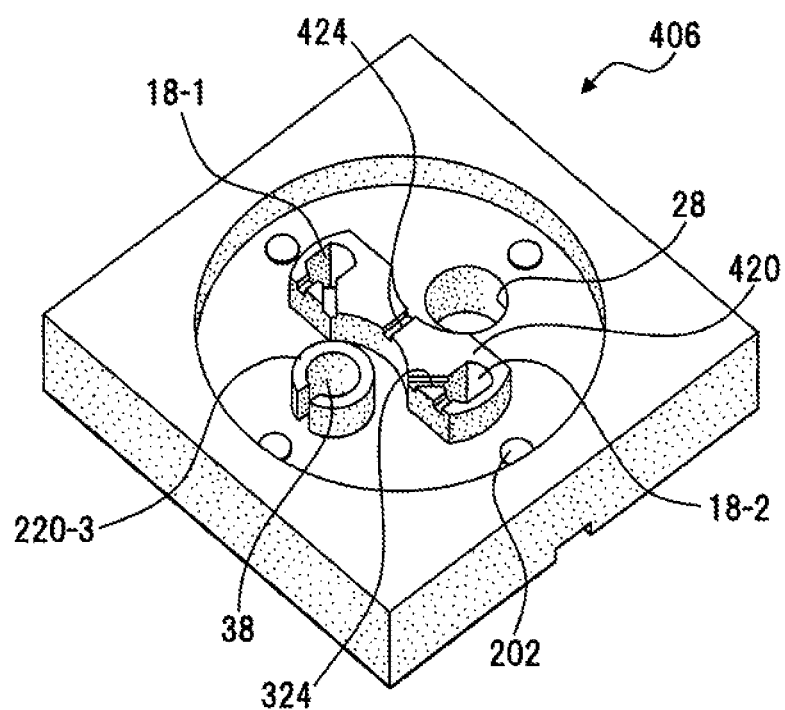
FIG. 16 is a diagram of a base according to another embodiment.

The base 206 includes a protruding portion 220-3 (a second protruding portion) that is disposed on a circumferential portion of the through hole 38 and between the through hole 38 and the resin injection hole 28. The through hole 38 is formed in the terminating portion that the resin finally reaches in the resin injection. The protruding portion 220-3 suppresses any straightforward reaching of the resin injected from the resin injection hole 28 to the through hole 38, and suppresses any filling of the through hole 38 by the resin before the resin fully permeates the end portion of the region in which the resin layer 8 is formed between the opening sealing member 14 and the base 206. The protruding portion 220-3 surrounds a portion such as, for example, two thirds of the circumference of the through hole 38. The protruding portion 220-3 surrounds preferably 50% or more and surrounds desirably 66% or more of the circumference of the through hole 38. For example, as depicted in FIG. 16, for example, 10% of the circumference of the through hole 38 may be open without being surrounded by the protruding portion 220-3.

The protruding portion 220-3 is disposed to be present along the edge portion of the through hole 38. The protruding portion 220-3 is adjacent to the edge portion of the through hole 38 and is not separated from this edge portion. Thus, remainder of any bubble is suppressed between the through hole 38 and the protruding portion 220-3. The outer side surface of the protruding portion 220-3 facing the resin injection hole 28 has a curved face such as an arc face and the resin can therefore smoothly flow along the outer side surface of the protruding portion 220-3.

The circumferential wall 22, the guide grooves 26-1 and 26-2, and the resin injection hole 28 included in the base 206, and the height of the protruding portions 220-1 and 220-2 are same as or similar to those of the first embodiment and will not again be described.

As depicted in FIG. 8B, the resin injected from the resin injection hole 28 spreads from the resin injection hole 28 toward the outer side thereof. The resin spreads passing through the resin path 140 and the outer side of each of the protruding portions 220-1 and 220-2. The resin fully permeates the overall formation region for the resin layer 8, thereafter passes through the opening of the protruding portion 220-3 not having the protruding portion 220-3, and reaches the through hole 38. The protruding portions 220-1 and 220-2 are symmetrically formed in the right-and-left direction, and can thereby cause the resin injected from the resin injection hole 28 to flow symmetrically in the right-and-left direction.

[Adjustment of Flow of Resin]

Figure 9:
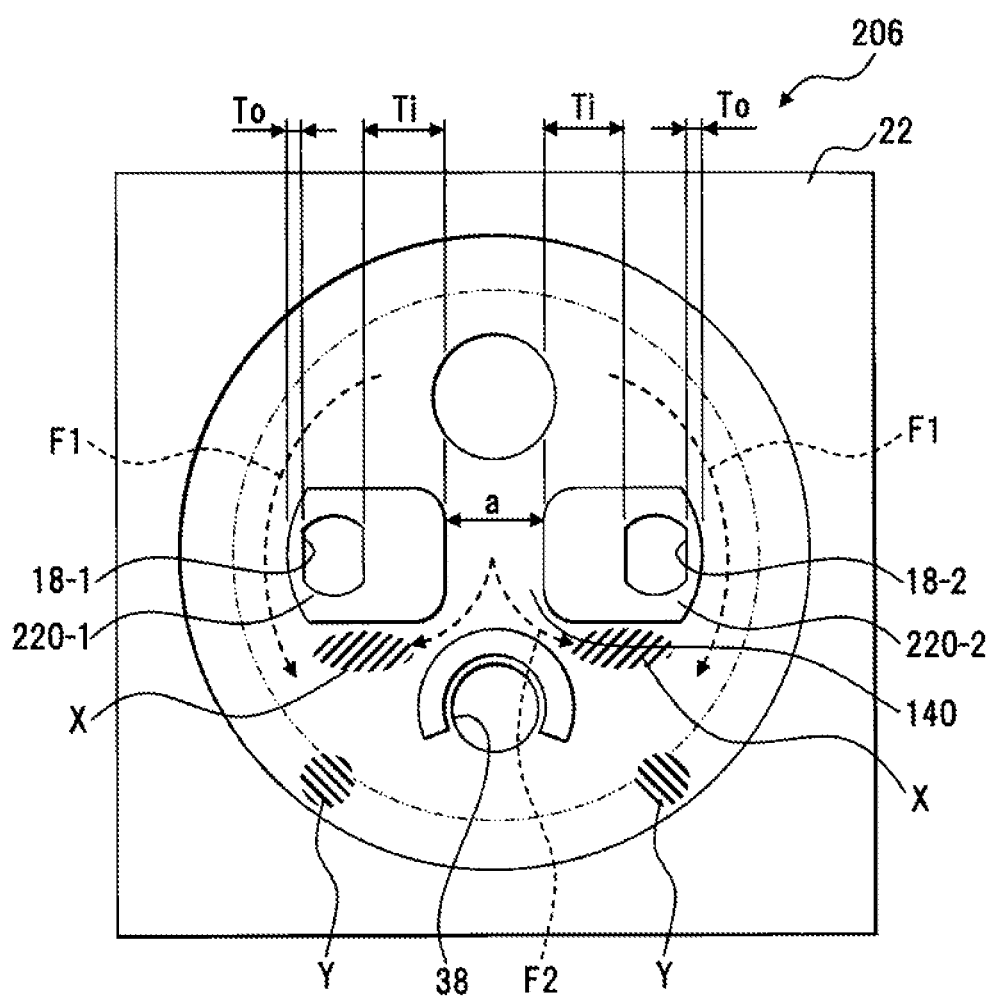
FIG. 9 is a diagram of an example of adjustment of the flow of the resin.

FIG. 9 depicts an example of adjustment of the flow of the resin. In FIG. 9, the support protruding portions 202 are not depicted. The thickness of each of the protruding portions 220-1 and 220-2 may be uniform or may be non-uniform. For example, as depicted in FIG. 9, the thickness of each of the protruding portions 220-1 and 220-2 is set such that an outer side thickness To of each of the protruding portions 220-1 and 220-2 is smaller than an inner side thickness Ti of each of the protruding portions 220-1 and 220-2. The outer side thickness To is the thickness of each of the protruding portions 220-1 and 220-2 close to the outer side of the base 206, and the width of the gap between each of the protruding portions 220-1 and 220-2, and the circumferential wall 22 is adjusted by increasing or decreasing the outer side thickness To. The outer side thickness To adjusts a flow F1 of the resin passing between each of the protruding portions 220-1 and 220-2, and the circumferential wall 22. The inner side thickness Ti is the thickness of each of the protruding portions 220-1 and 220-2 close to the inner side of the base 206, and the width "a" of the gap between the protruding portions 220-1 and 220-2, that is, the resin path 140 is adjusted by increasing or decreasing the inner side thickness Ti. The inner side thickness Ti adjusts a flow F2 of the resin passing between the protruding portions 220-1 and 220-2.

When the width "a" is small, the amount of the resin flowing along the flow F2 is small. In this case, before the resin flowing along the flow F2 reaches a region X, the resin flowing along the flow F1 runs in and reaches a region Y, and the possibility for air to remain in the region X thereby becomes high. In contrast, when the width "a" is large, the amount of the resin flowing along the flow F2 is large. In this case, before the resin flowing along the flow F1 reaches the through hole 38, the resin flowing along the flow F2 reaches the through hole 38, and the possibility for air to remain in the region Y thereby becomes high. The outer side thickness To and the inner side thickness Ti may be adjusted such that the resin is stably injected into the region X and the region Y. Production of any capacitor having air remaining therein can be suppressed and any dispersion of the quality of the capacitor can be suppressed, by adjusting the outer side thickness To and the inner side thickness Ti.

The steps for manufacturing the capacitor according to this embodiment are same as or similar to the steps for manufacturing the capacitor according to the first embodiment and will not again be described.

Characteristic items, advantages, modification examples, or the like will be listed below for the third embodiment.

(1) The advantages same as or similar to those of the first embodiment and the second embodiment are acquired, and same or similar modifications can be made.

(2) The support protruding portions 202 are in contact with the first portion of the tip portion of the outer package case 10, and the gap, that is, the resin path can be formed between the second portion of the tip portion of the outer package case 10 and the base 206. The resin passes through the gap between the second portion of the tip portion of the outer package case 10 and the base 206, reaches between the circumferential wall 22 and the outer circumferential face of the outer package case 10, and fills the space between the circumferential wall 22 and the outer package case 10 and the space between the base 206 and the tip portion of the outer package case 10. The sealability of the capacitor can thereby be enhanced.

(3) The protruding portion 220-3 is disposed between the through hole 38 and the resin injection hole 28, the through hole 38 is prevented from being filled by the resin before the resin fully permeates the end portion of the region in which the resin layer 8 is formed between the opening sealing member and the base 206, remainder of any air can thereby be suppressed, any degradation of the sealability of the capacitor can be suppressed, and the reliability of the sealability can be maintained.

(4) The number of the support protruding portions 202 is not limited to four. One or two elongated support protruding portion(s) 202 may be formed to stably support the capacitor main body. Three or more support protruding portions 202 may be formed to stably support the capacitor main body at three of more points.

Figure 10:
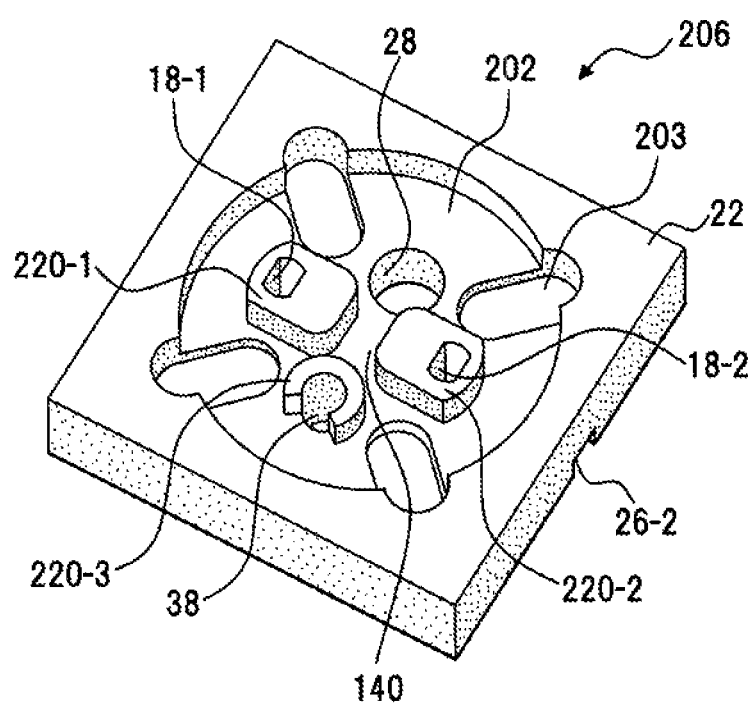
FIG. 10 is a perspective diagram of a base of a capacitor according to a modification example.

(5) As depicted in FIG. 10, the support protruding portions 202 may be formed on the base 206 by forming recessed portions 203. The support protruding portions 202 are in contact with the tip portion of the outer package case 10, and the recessed portions 203 can form a gap, that is a resin path between the tip portion of the outer package case 10 and the base 206. The resin can reach between the circumferential wall 22 and the outer circumferential face of the outer package case 10, and the resin can fill a space between the circumferential wall 22 and the outer package case 10 and a space between the base 206 and the tip portion of the outer package case 10.

Figure 11:
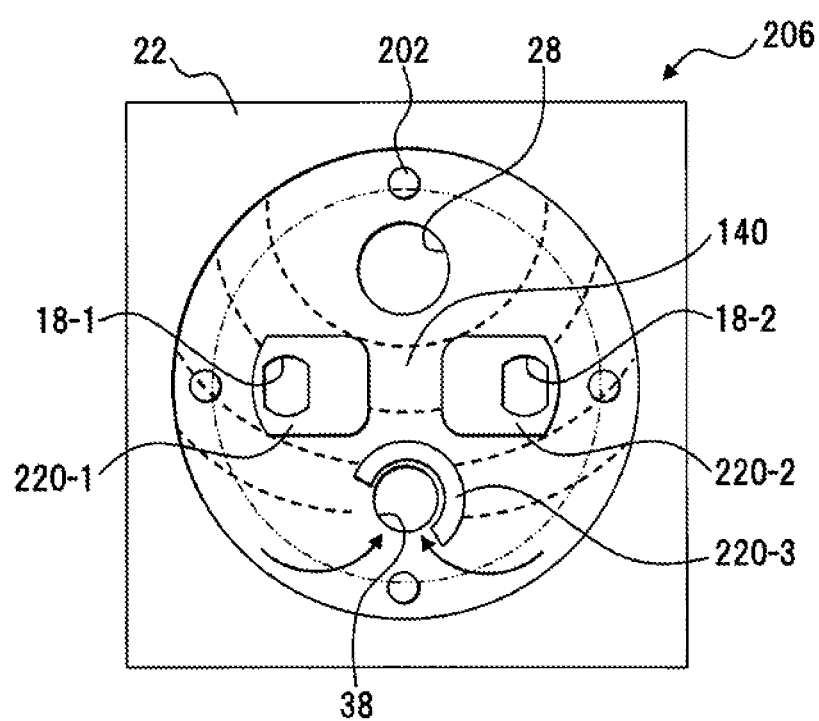
FIG. 11 is a diagram of a base of a capacitor according to a modification example and an example of the flow of the resin.

(6) In the third embodiment, as depicted in FIG. 8B, the shape of the protruding portion 220-3 is symmetrical in the right-and-left direction about the central line that connects the center of the resin injection hole 28 and the center of the through hole 38, while, as depicted in FIG. 11, the shape of the protruding portion 220-3 may be asymmetric in the right-and-left direction. The protruding portion 220-3 depicted in FIG. 11 is also disposed between the through hole 38 and the resin injection hole 28, the through hole 38 is prevented from being filled by the resin before the resin fully permeates the end portion of the region in which the resin layer 8 is formed between the opening sealing member and the base 206, remainder of any air is thereby suppressed, any degradation of the sealability of the capacitor can be suppressed, and the reliability of the sealability can be maintained.

(7) The shape of each of the support protruding portions 202 is not limited to the columnar shape. The shape of each of the support protruding portions 202 may be the shape of a polygonal prism such as a triangular prism and a quadrangular prism, may be a semispherical shape, or may be a columnar shape or a polygonal prism shape having the semispherical shape on the top thereof.

Fourth Embodiment

A capacitor of this embodiment has outer side protruding portions 317-1 and 317-2 formed on the opening sealing member 314 instead of the protruding portion 220-3 in the third embodiment.

Figure 12A:
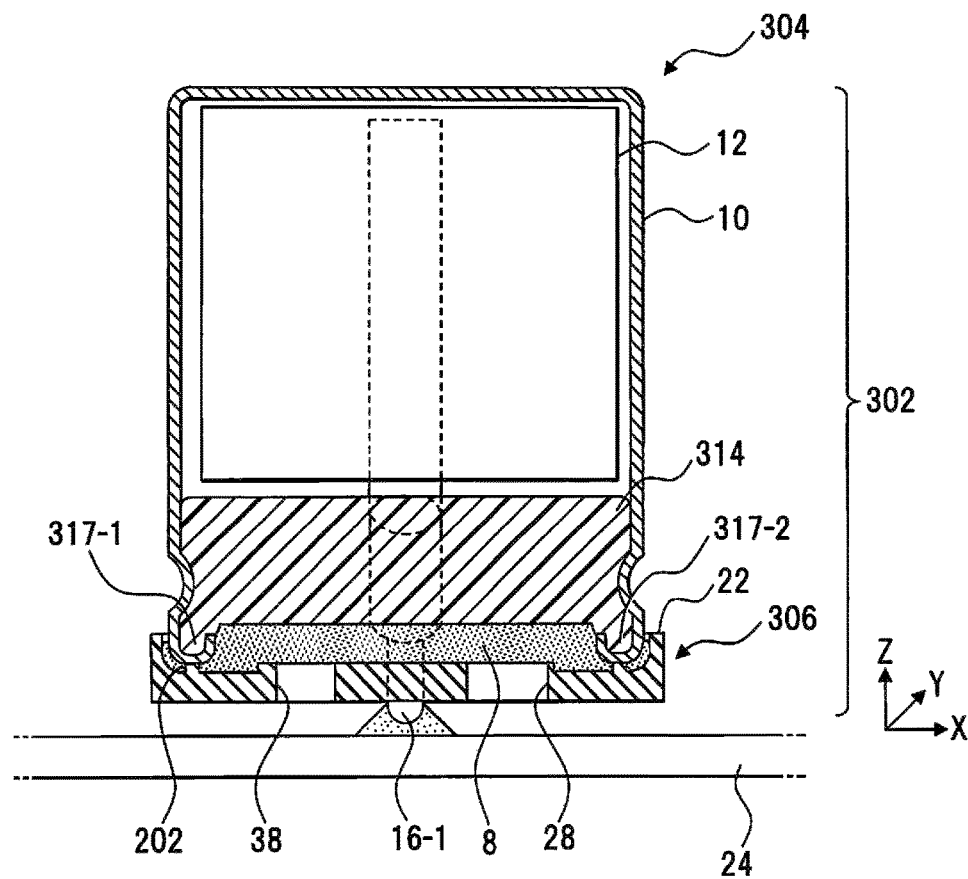
FIGS. 12A and 12B are cross-sectional diagrams of an example of a capacitor according to a fourth embodiment and a diagram of an example of the flow of the resin.
Figure 12B:
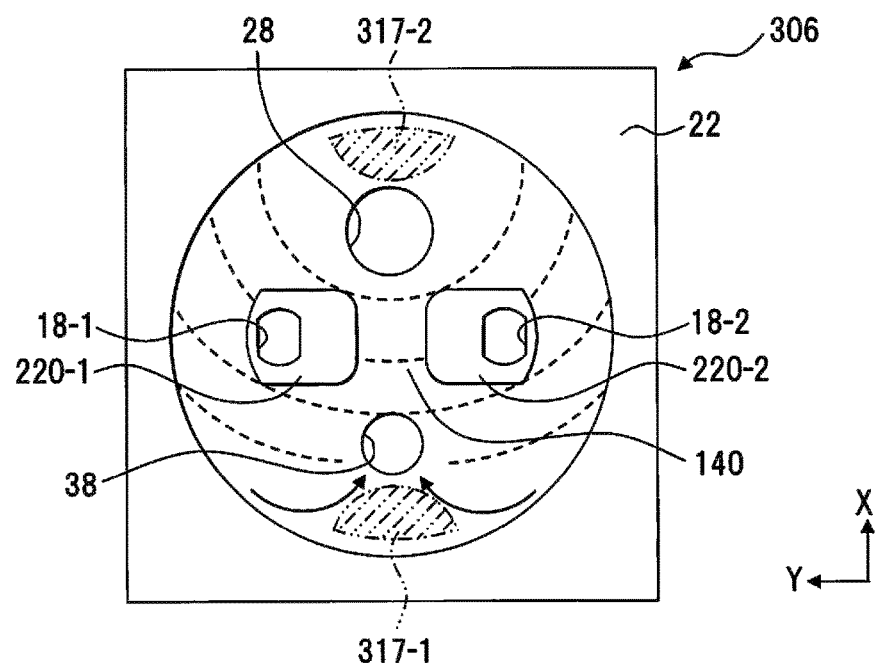

FIGS. 12A and 12B will be referred to for the capacitor of this embodiment. FIG. 12A is a cross-sectional diagram of an example of the capacitor according to the fourth embodiment, and FIG. 12B depicts the flow of the resin. Dotted lines each in a curved line form depicted in FIG. 12B indicate the position of the tip of the resin at one time point during the resin injection and indicate the state where the resin spreads. Arrows depicted in FIG. 12B indicate flows of the resin. In FIG. 12A, same parts as those in FIG. 2 are given the same reference signs. In FIG. 12B, same parts as those in FIG. 8B are given the same reference signs. The support protruding portions 202 are not depicted for the base 206 depicted in FIG. 12B. In FIG. 12A and FIG. 12B, a Cartesian coordinate system is set using X, Y, and Z such that the resin injection hole 28 and the through hole 38 are lined in the X-direction and the insertion through holes 18-1 and 18-2 are lined in the Y-direction.

A capacitor 302 is an example of an electro part and is, for example, an electrolytic capacitor or an electric double-layer capacitor. The capacitor 302 includes a capacitor main body 304, a base 306, and the resin layer 8. The capacitor main body 304 is same as or similar to the capacitor main body 4 of the first embodiment except the opening sealing member 14. The capacitor main body 304 includes an opening sealing member 314 instead of the opening sealing member 14. The opening sealing portion of the capacitor main body 304 is formed by the open end of the outer package case 10 and an opening sealing member 314.

The opening sealing member 314 includes outer side protruding portions 317-1 and 317-2 on an outer side surface of the opening sealing member 314. The outer side protruding portions 317-1 and 317-2 are each an example of the protruding portion on the side of the opening sealing member 314, are formed in a circumferential portion of the opening sealing member 314, and are arranged inside the curve that is formed at the open end of the outer package case 10 by the curling process. With this arrangement, the outer side protruding portions 317-1 and 317-2 fill the inside of the curve formed on the open end of the outer package case 10. The outer side protruding portions 317-1 and 317-2 may be integrally formed with the main body portion of the opening sealing member 314 or may be formed separately therefrom. Except the outer side protruding portions 317-1 and 317-2, the opening sealing member 314 is sane as or similar to the opening sealing member 14 of the first embodiment. As depicted in FIG. 12A, the outer side protruding portions 317-1 and 317-2 are adjacent to the resin layer 8.

The base 306 is same as or similar to the base 206 of the third embodiment without the protruding portion 220-3.

As depicted in FIG. 12B, in the state where the capacitor main body 304 is disposed on the base 306, the outer side protruding portion 317-1 is arranged in the circumferential portion of the through hole 38 and on the side more external of the base 306 than the through hole 38, that is, between the circumferential wall 22 formed on the circumferential portion of the base 306, and the through hole 38. The outer side protruding portion 317-2 is arranged in the circumferential portion of the resin injection hole 28 and on the side more external of the base 306 than the resin injection hole 28, that is, between the circumferential wall 22 and the resin injection hole 28. The outer side protruding portions 317-1 and 317-2 are arranged on the central line that connects the center of the resin injection hole 28 and the center of the through hole 38.

As depicted in FIG. 12B, the resin injected from the resin injection hole 28 spreads from the resin injection hole 28 toward the outer side thereof. The resin spreads passing through the resin path 140 and the outer side of each of the protruding portions 220-1 and 220-2. The resin fully permeates the overall formation region for the resin layer 8 and thereafter reaches the through hole 38. The outer side protruding portion 317-1 guides the resin on the side more external than the through hole 38 to the through hole 38, and the presence of the outer side protruding portion 317-1 suppresses formation of any bubble on the side more external of the base 306 than the through hole 38.

Figure 13A:
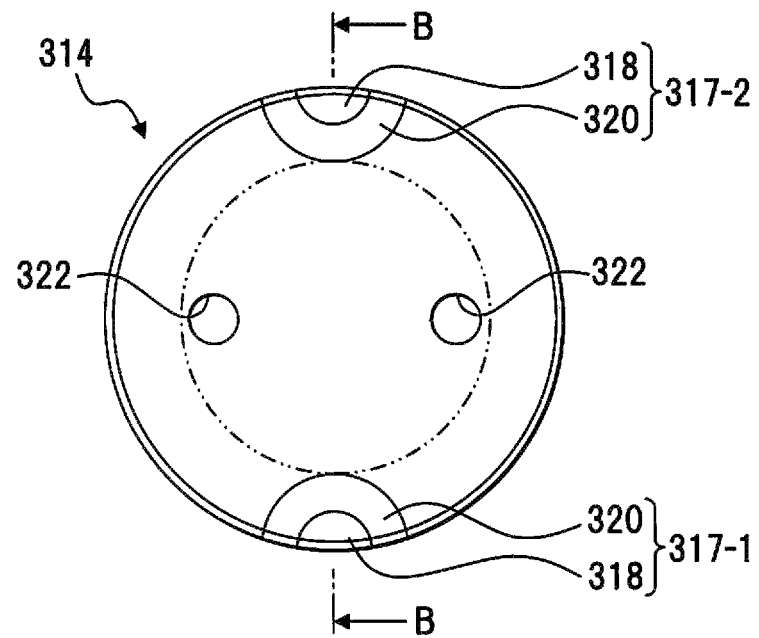
FIGS. 13A and 13B are diagrams of an example of an outer side surface and a cross-section of an opening sealing member.
Figure 13B:
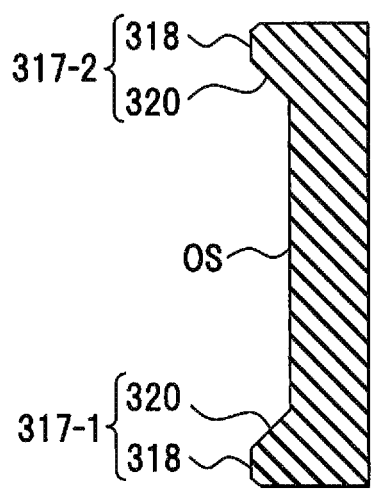

FIGS. 13A and 13B are diagrams of the opening sealing member. FIG. 13A is a diagram of the opening sealing member seen from the outer side surface thereof, and FIG. 13B is a diagram of a B-B cross-section of the opening sealing member depicted in FIG. 13A. The circular two-dot chain line depicted along the circumference of the opening sealing member 314 in FIG. 13A indicates the arrangement position of the curling-processed inner side end of the outer package case 10.

The outer side protruding portions 317-1 and 317-2 each include an apex portion 318 and a slope portion 320. The apex portion 318 has a flat face parallel to an outer side surface OS of the opening sealing member 314 and protrudes toward the side more external than the outer side surface OS, that is, toward the side of the base 306. The slope portion 320 includes a slope face connected to the apex portion 318 and the outer side surface OS of the opening sealing member 314. The outer side protruding portions 317-1 and 317-2 each has a partial truncated-corn shape formed by cutting off a portion thereof in a cylindrical shape by the edge portion of the opening sealing member 314. The outer side protruding portions 317-1 and 317-2 are formed, for example, line-symmetrically about the central line that connects the centers of two terminal holes 322 in which the lead portions of the terminal leads 16-1 and 16-2 are disposed, respectively.

At the steps for manufacturing the capacitor 302, the opening sealing member 314 including the outer side protruding portions 317-1 and 317-2 is formed, and the opening sealing member 314 is attached to the opening portion of the outer package case 10 such that the outer side protruding portions 317-1 and 317-2 are arranged on the outer side of the capacitor main body 304. Other steps for the manufacturing are same as or similar to the steps for manufacturing the capacitor according to the first embodiment and will not again be described.

Characteristic items, advantages, modification examples, or the like will be listed below for the fourth embodiment.

(1) The advantages same as or similar to those of the first embodiment are acquired and same or similar modifications can be made. In the first embodiment, the portion of the protruding portion 20 is disposed to surround the through hole 38 and even the portion far from the resin injection hole 28 than the through hole 38 is thereby filled with the resin to suppress remainder of any air while, in the fourth embodiment, remainder of any air is suppressed by the outer side protruding portion 317-1. The outer side protruding portion 317-1 is arranged on the side of the circumferential wall 22 of the through hole 38, remainder of any air can thereby be suppressed in the vicinity of the through hole 38 present at the position farthest from the resin injection hole 28, any degradation of the sealability of the capacitor can be suppressed, and the reliability of the sealability can be maintained.

(2) Same as or similar to the third embodiment, the resin path can be formed by the support protruding portions 202, the resin can fill the space between the circumferential wall 22 and the outer package case 10 and the space between the base 6 and the tip portion of the outer package case 10, and the sealability of the capacitor can be enhanced.

(3) Same as or similar to the third embodiment, the number or the shape of the support protruding portions 202 can be varied and modifications can be made to the support protruding portions 202 depicted in FIG. 10.

Figure 14A:
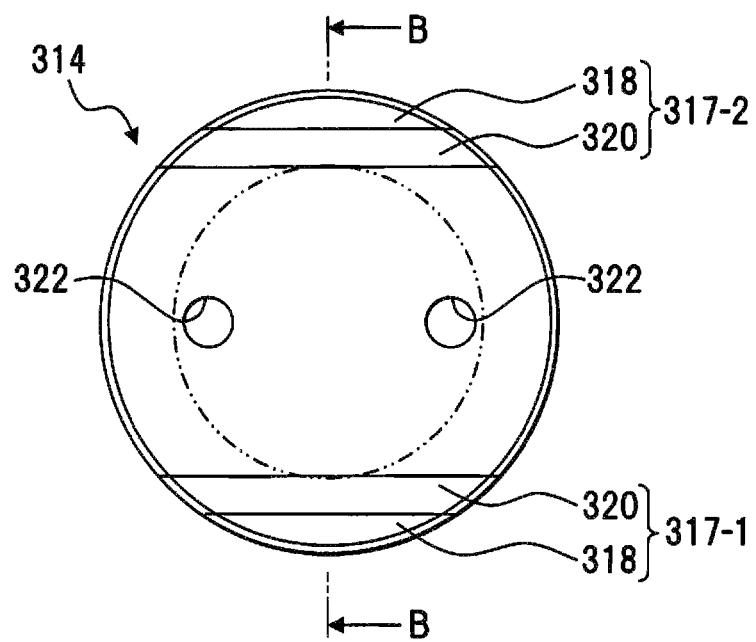
FIGS. 14A and 14B are diagrams of an outer side surface and a cross-section of an opening sealing member according to a modification example.
Figure 14B:
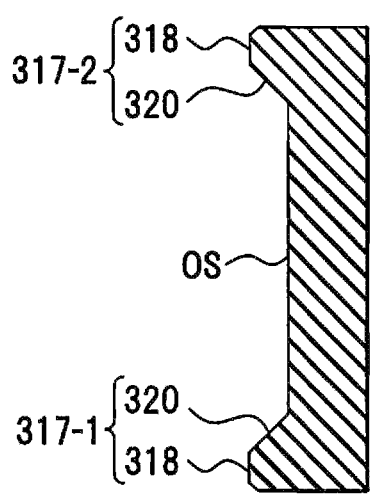

(4) The outer side protruding portions 317-1 and 317-2 each has the partial truncated-corn shape formed by cutting off the portion thereof in a cylindrical shape by the edge portion of the opening sealing member 314 in the fourth embodiment, while the shape of each of the outer side protruding portions 317-1 and 317-2 is not limited to the truncated-corn shape. For example, as depicted in FIG. 14A, the border line between the apex portion 318 and the slope portion 320 and the border line between the slope portion 320 and the outer side surface OS of the opening sealing member 314 may each be formed in a straight line and the outer side protruding portions 317-1 and 317-2 may each be formed in a belt-like shape. The belt-like outer side protruding portions 317-1 and 317-2 fill the inside of the curve formed on the open end of the outer package case 10, and the outer side protruding portion 317-1 can guide the resin present on the side more external of the base 306 than the through hole 38 to the through hole 38 and can suppress formation of any bubble on the side more external of the base 306 than the through hole 38. Any degradation of the sealability of the capacitor can be suppressed by the suppression of the bubble and the reliability of the sealability can be maintained.

(5) The outer side protruding portions 317-1 and 317-2 may be formed asymmetrically about the central line that connects the centers of the two terminal holes 322. For example, the outer side protruding portion 317-1 may be the outer side protruding portion 317-1 depicted in FIG. 13A, and the outer side protruding portion 317-2 may be the outer side protruding portion 317-2 depicted in FIG. 14A.

(6) The two outer side protruding portions 317-1 and 317-2 are formed on the opening sealing member 314 in the fourth embodiment, while the outer side protruding portion 317-2 may not be formed. When the outer side protruding portion 317-1 is formed on the opening sealing member 314, remainder of any bubble on the side more external of the base 306 than the through hole 38 can be suppressed. When the two outer side protruding portions 317-1 and 317-2 are formed on the opening sealing member 314, remainder of any bubble can be suppressed by either the outer side protruding portion 317-1 or the outer side protruding portion 317-2. The capacitor main body 304 can therefore be disposed on the base 306 without taking into consideration the position of the outer side protruding portion 317-1, and the load of checking the position of the outer side protruding portion 317-1 can be reduced.

(7) The outer side protruding portions 317-1 and 317-2 are arranged on the central line that connects the center of the resin injection hole 28 and the center of the through hole 38, while the outer side protruding portions 317-1 and 317-2 may be arranged in the vicinity of this central line.

(8) The outer side protruding portions 317-1 and 317-2 are arranged inside the curve formed on the open end of the outer package case 10 by the curling process, while the outer side protruding portions 317-1 and 317-2 may be arranged inside the curve and on the side more internal of the base 306 than the curve. Remainder of any bubble can further be suppressed by setting the outer side protruding portions 317-1 and 317-2 to be close to the through hole.

(9) The outer side protruding portions 317-1 and 317-2 may be included together with the protruding portion 20 described in the first embodiment or the protruding portion 220-3 described in the third embodiment. The effect of suppressing any bubble is enhanced by including the two or more means of suppressing the remainder of any bubble.

Figure 15:
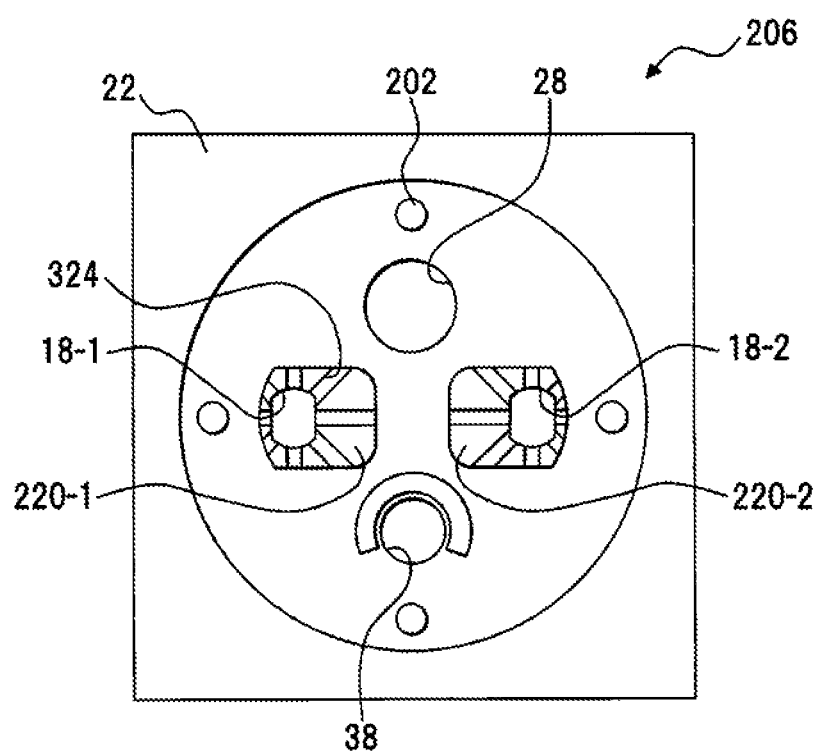
FIG. 15 is a diagram of a base according to another embodiment.

Other Embodiments (1) In examples described in the above embodiments, the height of each of the protruding portions 20, 120-1, 120-2, 220-1, and 220-2 is set to be equal to or larger than the elevation difference H, so that the protruding portions 20, 120-1, 120-2, 220-1, and 220-2 are in contact with the opening sealing member 14 or 314, and in other examples described in the above embodiments, the height of each of the protruding portions 20, 120-1, 120-2, 220-1, and 220-2 is set to be smaller than the elevation difference H, so that the gaps are formed between the protruding portions 20, 120-1, 120-2, 220-1, and 220-2 and the opening sealing member 14 or 314. However, the protruding portions 20, 120-1, 120-2, 220-1, and 220-2 are not limited to those of the above examples and may be changed as necessary. For example, groove portions may be formed in the apex portion of each of the protruding portions 20, 120-1, 120-2, 220-1, and 220-2 at predetermined intervals (for example, 90 degrees) about the center of each of the insertion through holes 18-1 and 18-2. The intervals of the groove portions are each not limited to 90 degrees. For example, as depicted in FIG. 15, eight groove portions 324 may be formed at angles each of 45 degrees about the center of each of the insertion through holes 18-1 and 18-2. The protruding portions 20, 120-1, 120-2, 220-1, and 220-2 each having the groove portions 324 formed thereon are brought into contact with the opening sealing member 14 or 314. According to these configurations, because of the contact of the protruding portions 20, 120-1, 120-2, 220-1, and 220-2, and the opening sealing member 14 or 314 with each other, the stability of the installation of each of the bases 6, 106, 206, and 306 can be improved, the ventilation paths are formed by the groove portions 324, and the air pushed out by the injection of the resin can thereby be discharged to the exterior through the groove portions 324. Moreover, the opening area of each of the ventilation paths and the opening area of the overall ventilation paths can be managed and adjusted by varying the width, the depth, the installation interval, or the installation quantity of the groove portions 324, and any intrusion of the resin can easily be suppressed admitting the passage of the air. The width, the depth, the installation interval, or the installation quantity of the groove portions 324 are set as necessary taking into consideration the passage of the air and the suppression of any intrusion of the resin. For example, as depicted in FIG. 16, the groove portions 324 may be formed only on the side of the opposite face portion opposite to the facing face portion that faces the resin injection hole 28 without forming the groove portions 324 on the side of the facing face portion. The groove portion 324 is not formed in the direction in which the resin comes flowing for a base 406 depicted in FIG. 16, the possibility for the resin to exit from the insertion through holes 18-1 and 18-2 through the groove portions 324 can thereby be reduced and the air can be discharged from the insertion through holes 18-1 and 18-2 through the groove portions 324 formed on the side of the terminating portion that the resin finally reaches.

(2) The protruding portions 120-1 and 120-2 or the protruding portions 220-1 and 220-2 surrounding the insertion through holes 18-1 and 18-2 respectively are formed and the resin path is set between the protruding portions 120-1 and 120-2 or the protruding portions 220-1 and 220-2 in the second embodiment to the fourth embodiment, while the configuration is not limited to these. For example, as depicted in FIG. 16, a groove portion 424 including a groove for the resin to pass therethrough may be formed on a protruding portion 420 that is formed integrally by the protruding portions surrounding the insertion through holes 18-1 and 18-2 like the protruding portion 20 in the first embodiment. This groove portion 424 is formed by reducing the height of a portion of the intermediate portion between the insertion through hole 18-1 and the insertion through hole 18-2, and extends between the side of the resin injection hole 28 and the side of the through hole 38 to form a resin path. The flow amount of the resin flowing through the width a of the resin path 140 depicted in FIG. 9 can be limited by configuring as above.

(3) The protruding portion 220-3 is adjacent to the edge portion of the through hole 38 in the third embodiment. However, it is only required that remainder of any bubble is suppressed between the through hole 38 and the protruding portion 220-3 and, as depicted in FIG. 16, the end portion of the protruding portion 220-3 may match with the edge portion of the through hole 38 so that the end portion of the protruding portion 220-3 and the edge portion of the through hole 38 form one curved face.

Figure 17:
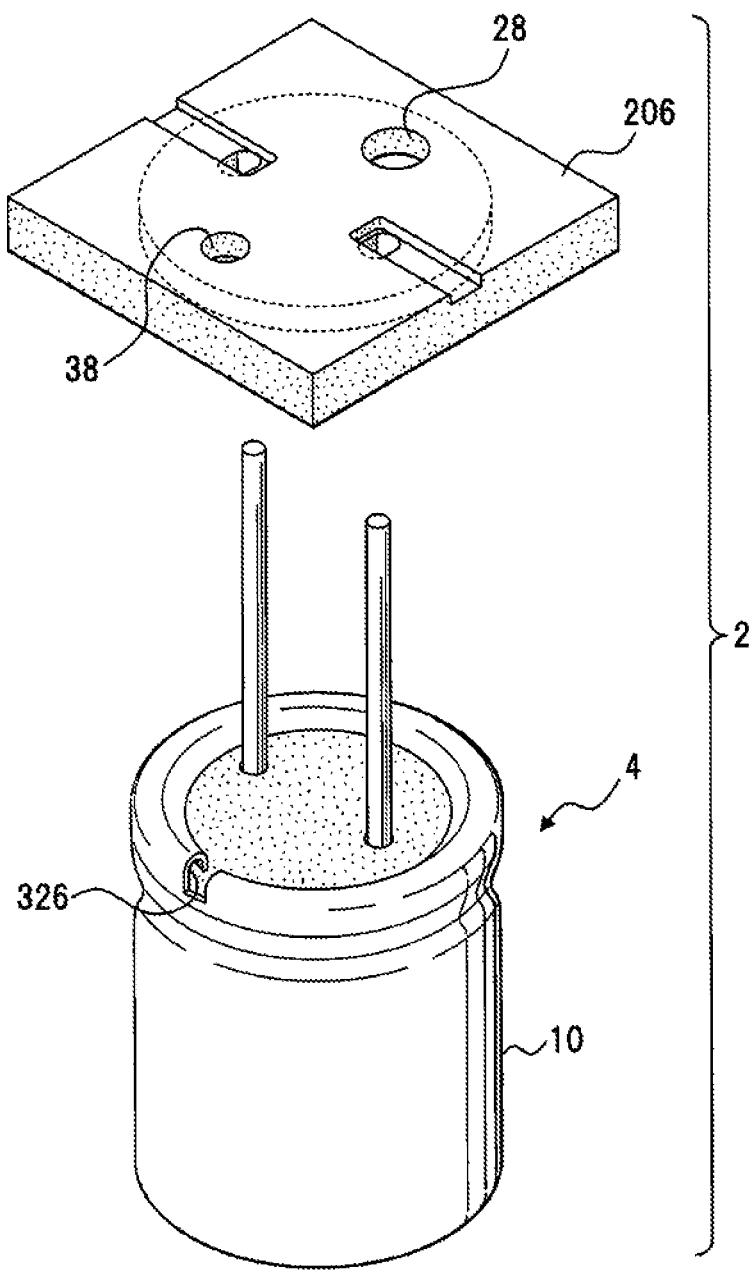
FIG. 17 is an exploded perspective diagram of a capacitor according to another embodiment.

(4) In the first embodiment to the fourth embodiment, the protruding portions 20, 220-3, or the outer side protruding portions 317-1 and 317-2 are disposed in the terminating portion 204 for the resin injection or in the circumferential portion of the through hole 38, and remainder of any air in the vicinity of the terminating portion 204 or the through hole 38 is suppressed. However, for example, in the capacitor 2 according to the third embodiment, a through hole may be formed in a portion of the open end of the outer package case 10, or a notch portion 326 may be formed in a portion of the open end of the outer package case 10 as depicted in FIG. 17 so that a discharge path for the air is formed. Remainder of the air can further be suppressed by discharging the air from the notch portion 326 to the exterior. The through hole or the notch portion 326 is applicable to the embodiments other than the third embodiment. Remainder of any air may be suppressed by the through hole or the notch portion 326 without forming the protruding portions 20, 220-3, or the outer side protruding portions 317-1 and 317-2.

(5) The curling formed in each of the capacitor main bodies 4 and 304 may not be formed. The resin injection to the outer circumference side of the resin layer 8 can easily be controlled by not forming the curling.

(6) Not all of the configurations of (a) to (c) described below need to be included, so that improvement or maintenance of the sealability of the capacitor 2, or suppression of any degradation of the sealability is enabled by including any one of the configurations.
(a) The configuration to suppress any outflowing of the resin by the protruding portions 20, 120-1, 120-2, 220-1, and 220-3.
(b) The configuration to form the resin path by the support protruding portions 202.
(c) The configuration to suppress remainder of any air by the protruding portions 20 and 220-3 or the outer side protruding portion 317-1.

As above, the most preferred embodiment etc. of the present invention have been described, while the present invention is not limited to the above description, and those skilled in the art can naturally make various modifications and various changes thereto on the basis of the gist of the present invention described in the claims or disclosed in the description. The modifications and changes are obviously included in the scope of the present invention.

INDUSTRIAL APPLICABILITY

The capacitor and the method for manufacturing the capacitor of the present invention can be widely used in electronic devices and are useful.

REFERENCE SIGNS LIST 2, 302 capacitor
4, 304 capacitor main body
6, 106, 206, 306, 406 base
8 resin layer
10 outer package case
12 capacitor element
14 opening sealing member
16-1, 16-2 terminal lead
18-1, 18-2 insertion through hole
20, 120-1, 120-2, 220-1, 220-2, 220-3, 420 protruding portion
22 circumferential wall
24 wiring board
26-1, 26-2 guide groove
28 resin injection hole
30, 36, 130-1, 130-2 retreat portion
32-1, 32-2 flat portion
34 opening
38 through hole
140 resin path
201 resin path
202 support protruding portion
203 recessed portion
204 terminating portion
317-1, 317-2 outer side protruding portion
318 apex portion
320 slope portion
322 terminal hole
324, 424 groove portion
326 notch portion

The invention claimed is:
1. A capacitor comprising:
a capacitor main body including an outer package case, an opening sealing member attached to an inside of an open portion of the outer package case and a terminal lead penetrating through the opening sealing member;
a base attached to an outside of the open portion of the outer package case, the base including an insertion through hole through which the terminal lead passes to be disposed on an outer side of the base; and
a resin layer between the base and the opening sealing member, wherein
the base further includes a resin injection hole that is used for injection of a resin, a through hole that is used for discharging air pushed out by the injection of the resin and for checking the injected resin, and a first protruding portion disposed between the through hole and the resin injection hole.
2. The capacitor according to claim 1, wherein
the first protruding portion is disposed along 50% or more of the edge portion of the through hole or along 66% or more of the edge portion of the through hole.

3. The capacitor according to claim 1, wherein
the base or the opening sealing member includes a second protruding portion that is adjacent to the resin layer and isolates the insertion through hole from the resin layer.
4. The capacitor according to claim 3, wherein
the second protruding portion is disposed on a face portion on the side of the opening sealing member of the base and surrounds the insertion through hole.
5. The capacitor according to claim 3, wherein
the second protruding portion is in contact with the opening sealing member.
6. The capacitor according to claim 3, wherein
the second protruding portion includes a ventilation path that causes the insertion through hole to communicate with the resin layer between the base and the opening sealing member.
7. The capacitor according to claim 1, further comprising a resin path formed by a space between a tip portion of the outer package case and the base.
8. The capacitor according to claim 1, wherein
the first protruding portion is disposed along a part of an edge portion of the through hole.
9. The capacitor according to claim 8, wherein
the first protruding portion is disposed along 50% or more of the edge portion of the through hole or along 66% or more of the edge portion of the through hole.

* * * * *